United States Patent [19]

Long, Jr.

[11] Patent Number: 4,819,721

[45] Date of Patent: Apr. 11, 1989

[54] REMOTELY CONTROLLED ARTICULATABLE HYDRAULIC CUTTER APPARATUS

[75] Inventor: Charles A. Long, Jr., Birmingham, Ala.

[73] Assignee: Long Technologies, Inc., Birmingham, Ala.

[21] Appl. No.: 60,126

[22] Filed: Jun. 9, 1987

[51] Int. Cl.⁴ ............................................. E03F 3/06
[52] U.S. Cl. ..................................... 166/55; 175/77; 175/78; 409/143; 409/190
[58] Field of Search .................. 166/55, 206, 55.2, 50, 166/212, 55.7, 55.8, 117.7; 175/78, 77, 97–99, 230; 409/143, 179, 190

[56] References Cited

U.S. PATENT DOCUMENTS

| | | | |
|---|---|---|---|
| 602,301 | 4/1898 | Bramlette | 166/55.3 |
| 2,178,554 | 11/1939 | Bowie | 175/90 |
| 2,198,821 | 4/1940 | Jessup | 166/100 |
| 2,326,827 | 8/1943 | Bynum | 175/77 |
| 2,327,023 | 8/1943 | Danner | 175/78 |
| 2,345,766 | 4/1944 | Miller | 175/256 |
| 2,354,399 | 7/1944 | Noble | 175/248 |
| 2,622,327 | 12/1952 | Halonen | 33/21 C |
| 2,697,585 | 12/1954 | Chaney et al. | 175/77 |
| 2,971,259 | 2/1961 | Hahnau et al. | 33/1 |
| 3,175,392 | 3/1965 | Tharalson et al. | 73/84 |
| 3,464,313 | 9/1969 | Shay et al. | 90/12 |
| 3,587,194 | 6/1971 | Brown | 166/55 X |
| 3,827,512 | 8/1974 | Edmond | 175/99 X |
| 4,009,063 | 2/1977 | Wood | 156/71 |
| 4,064,211 | 12/1977 | Wood | 264/95 |
| 4,135,958 | 1/1979 | Wood | 156/199 |
| 4,197,908 | 4/1980 | Davis et al. | 166/55 |
| 4,442,891 | 4/1984 | Wood | 166/55.2 |
| 4,577,388 | 3/1986 | Wood | 166/55 X |
| 4,630,676 | 12/1986 | Long | 166/55 |
| 4,648,454 | 3/1987 | Yarnell | 166/55.7 X |
| 4,701,988 | 10/1987 | Wood | 166/55.2 |
| 4,714,119 | 12/1987 | Hebert et al. | 175/78 X |

FOREIGN PATENT DOCUMENTS 1154778  4/1956  Fed. Rep. of Germany ........ 166/55

Primary Examiner—Hoang C. Dang
Attorney, Agent, or Firm—Panitch Schwarze Jacobs & Nadel

[57] ABSTRACT

A remotely controlled, hydraulically operated cutter apparatus for use in a conduit includes control panel for generating a plurality of control signals for controlling the operation and a source of pressurized hydraulic fluid. Valves are provided for receiving both the pressurized fluid and the control signals, and for distributing the received fluid in accordance with the received control signals. A hydraulically powered cutter motor located within the conduit and including a cutting tool receives hydraulic fluid from the valves for driving the cutting tool. The cutter motor is supported within the conduit by a structural unit. A first hydraulically actuated cylinder is included for receiving hydraulic fluid from the valves and for centering and holding the structural unit in a fixed axial position within the conduit. Second, third, fourth and fifth hydraulically actuated cylinders are provided for adjusting the axial and radial position of the cutter motor, for rotating the cutter motor and for adjusting the angular position of the cutter motor to facilitate cutting by the cutting tool.

18 Claims, 15 Drawing Sheets

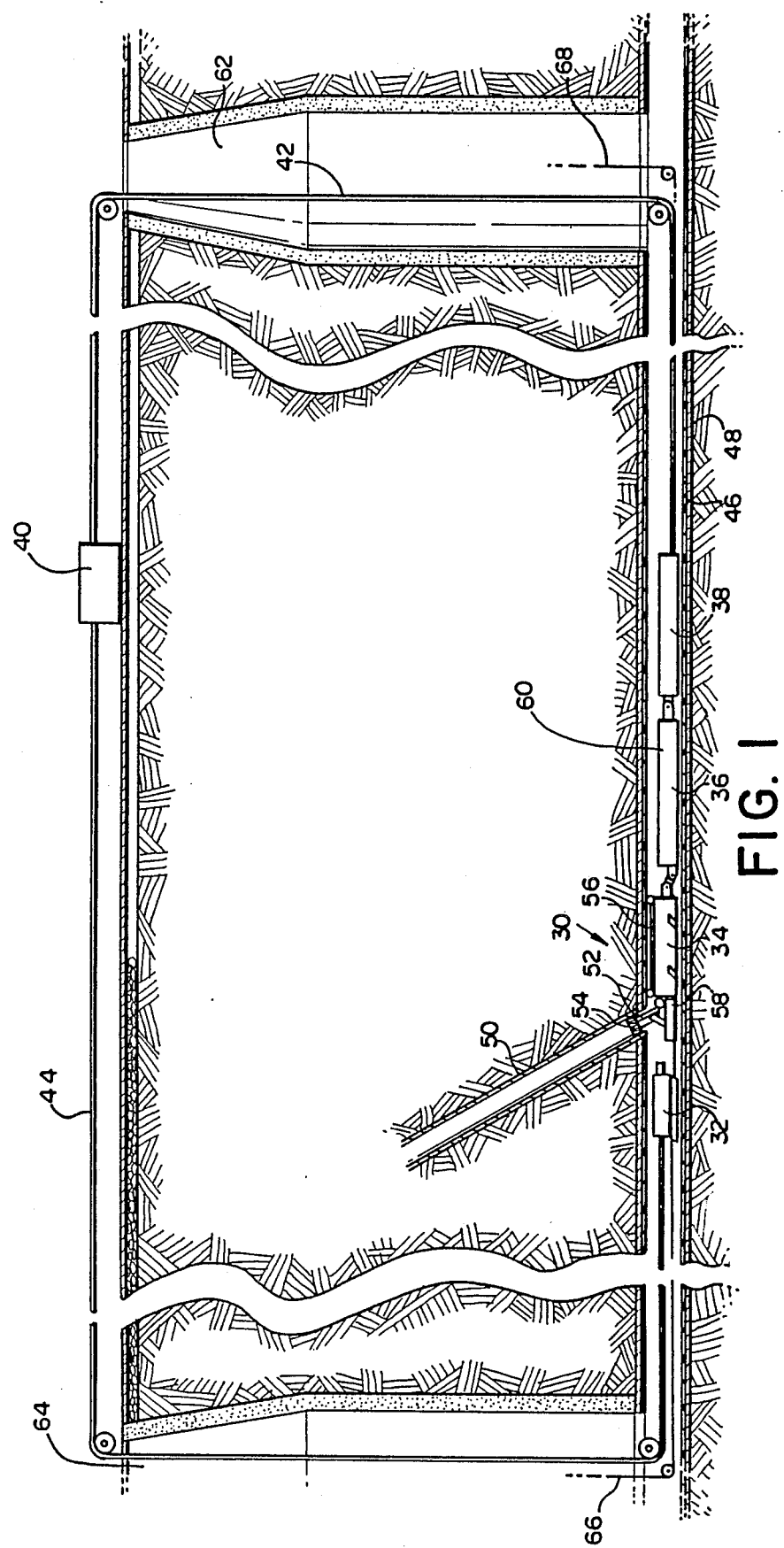

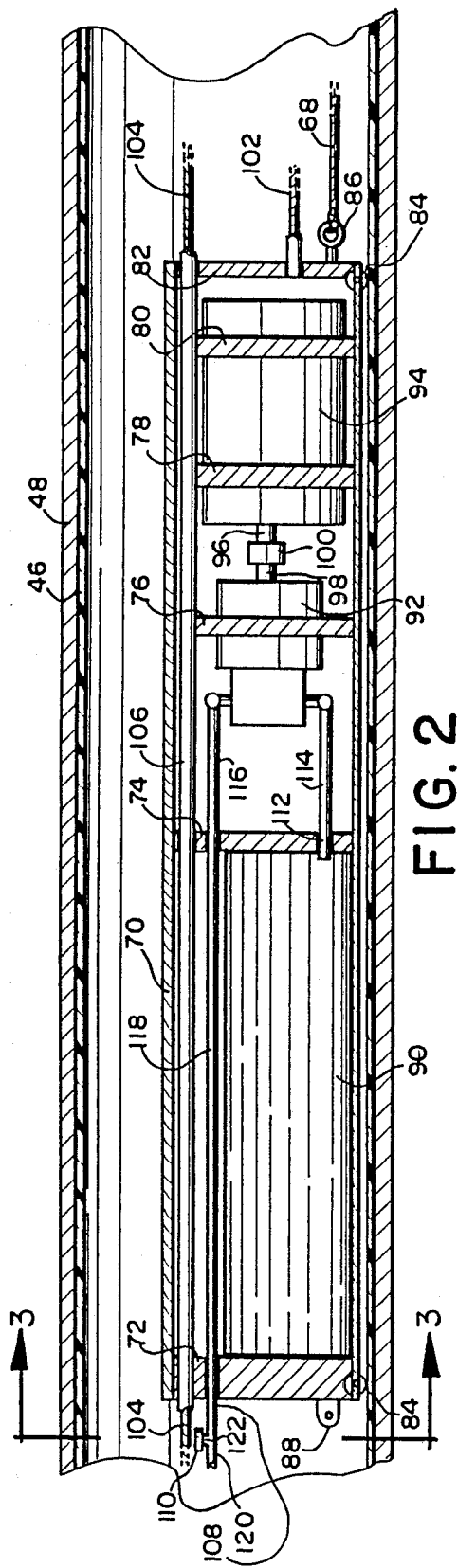
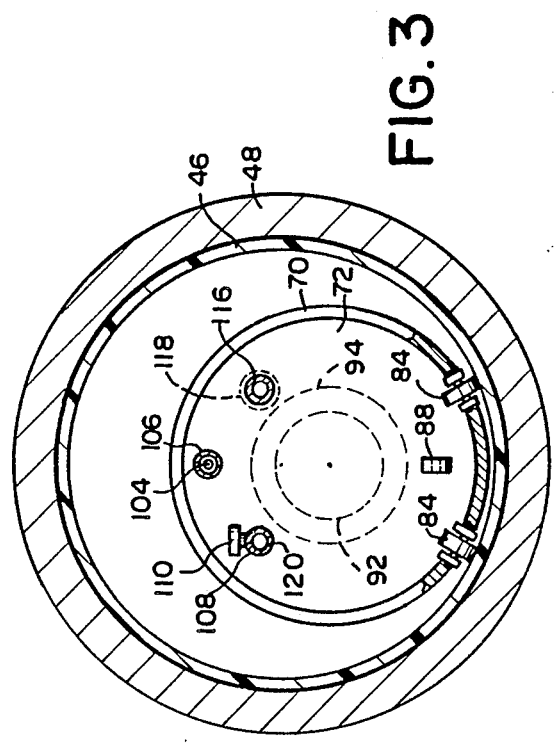

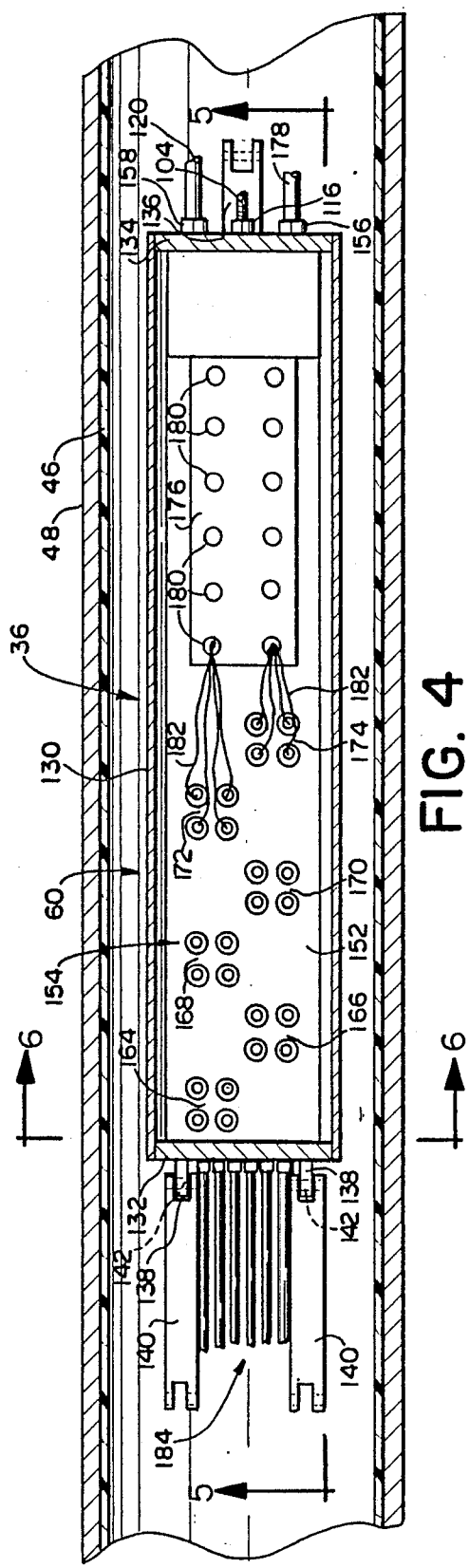
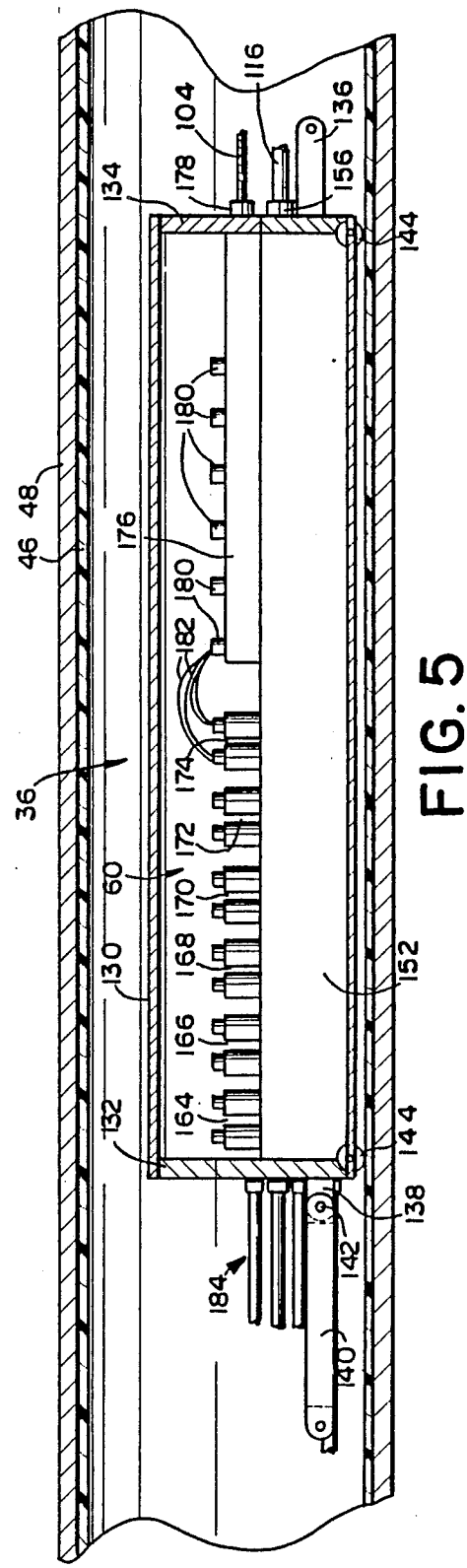

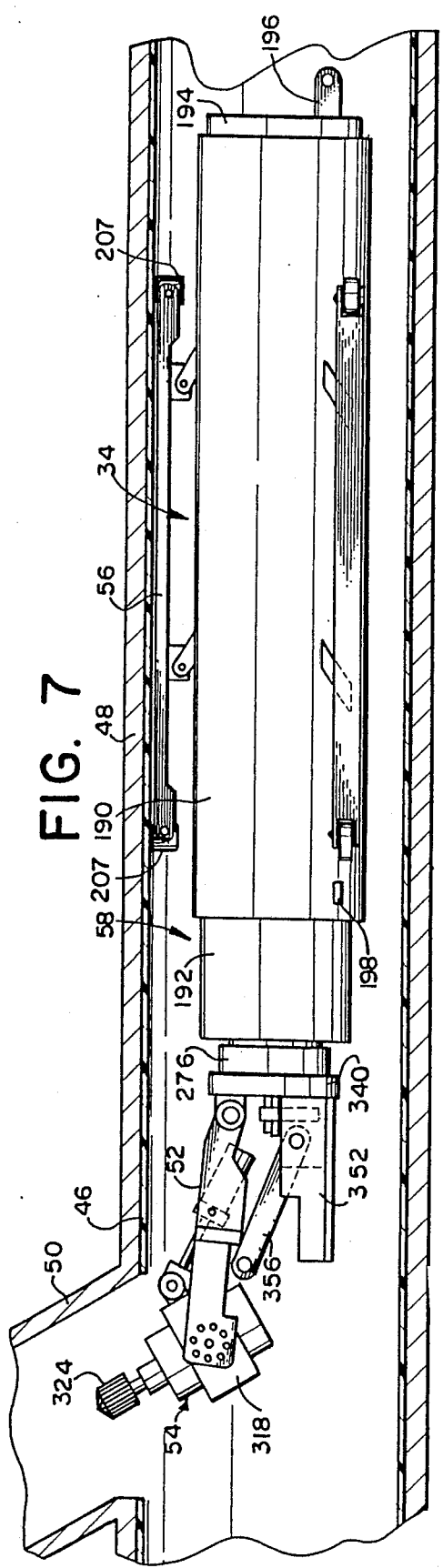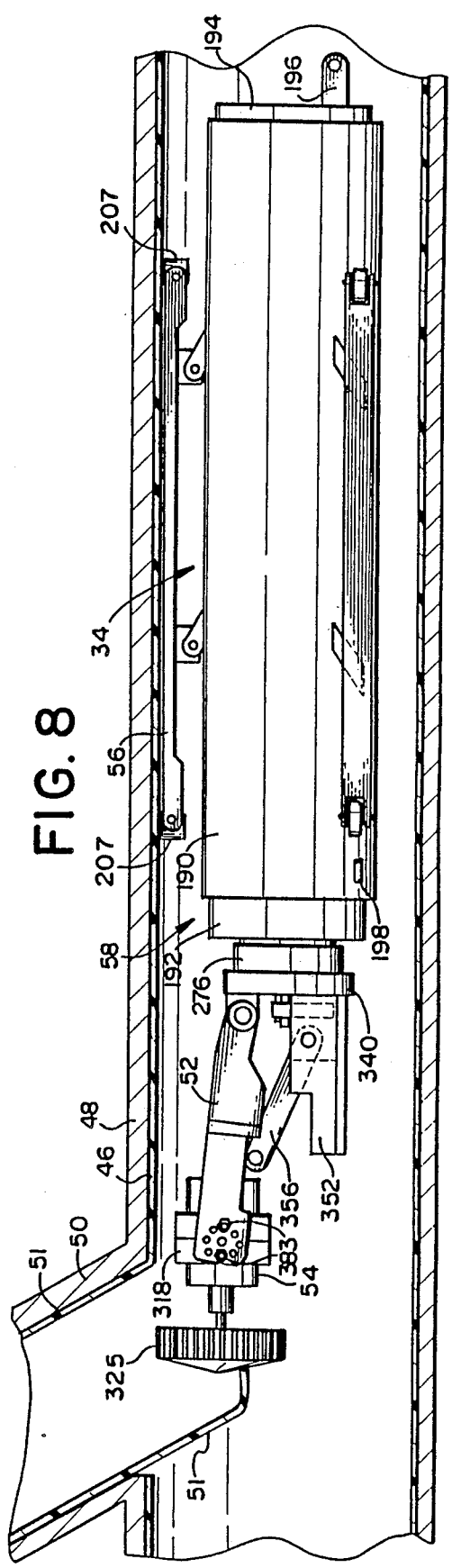

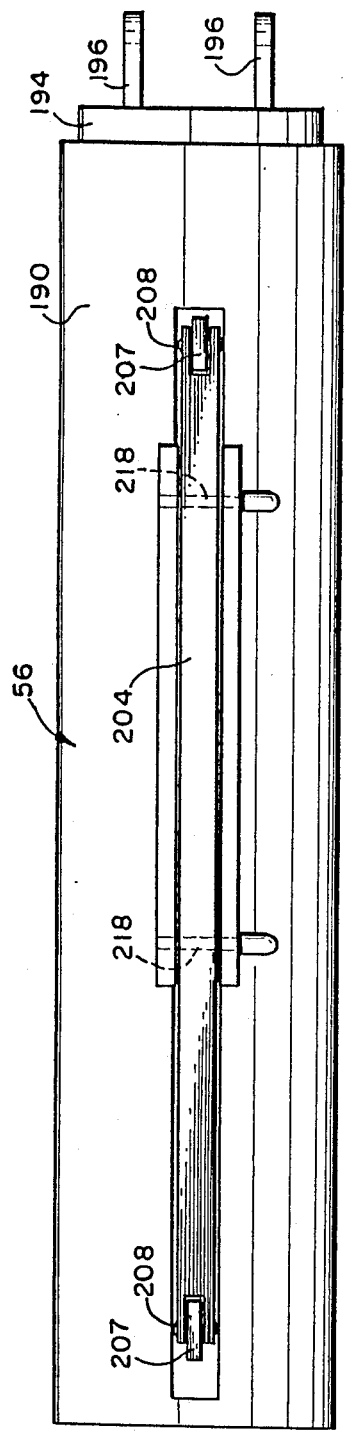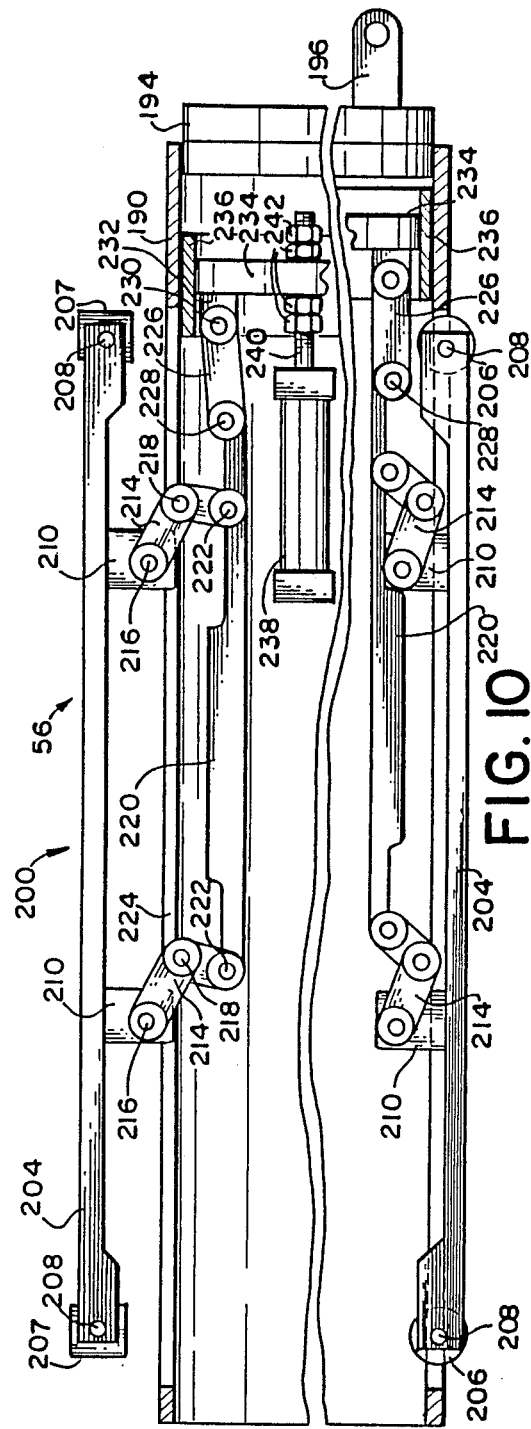

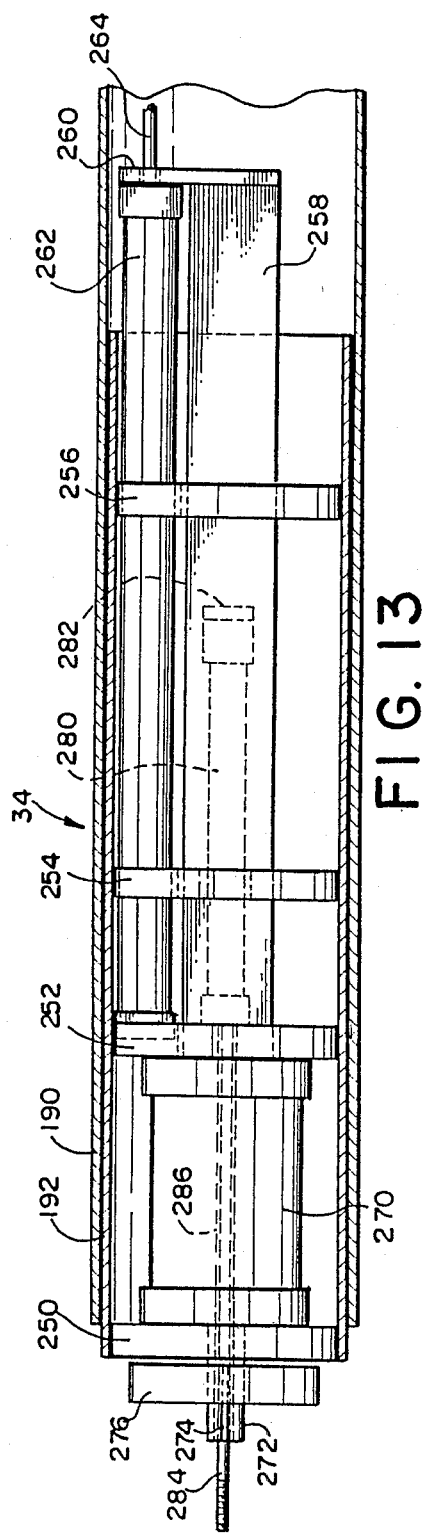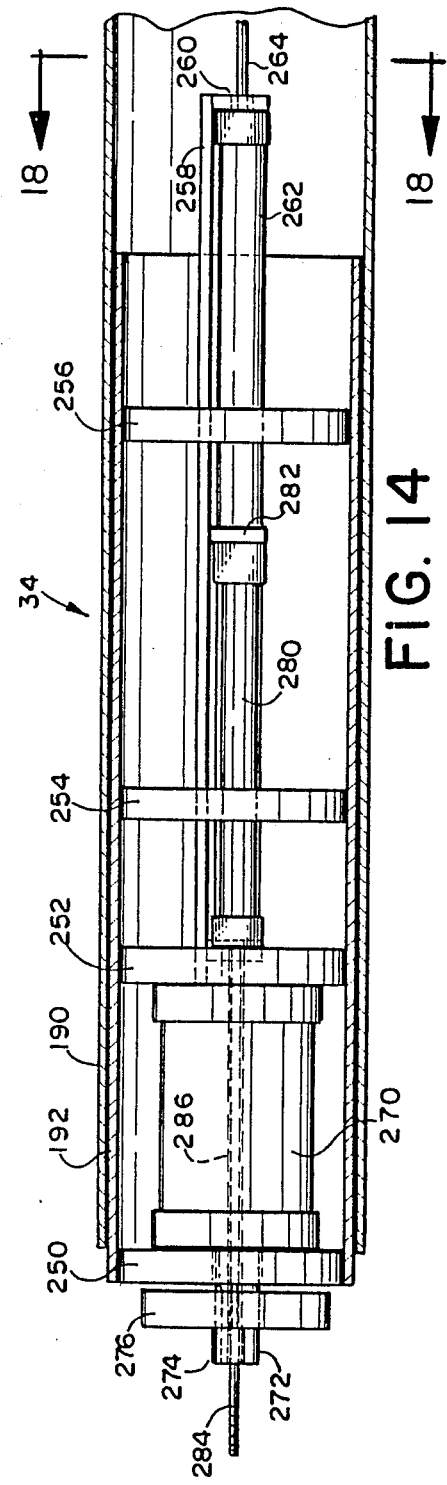

REMOTELY CONTROLLED ARTICULATABLE HYDRAULIC CUTTER APPARATUS

BACKGROUND OF THE INVENTION

The present invention relates generally to a remotely controlled, articulatable hydraulically operated cutter apparatus and, more particularly, to such an apparatus for use within a conduit or pipe.

It is generally well known that conduits or pipes which are employed for conducting fluids, for example, sanitary sewer pipes, storm sewer pipes, water lines and gas lines, frequently require repair due to leakage. The leakage may be inwardly, from the environment into the pipe, or outwardly, from the pipe into the environment. Leakage of this type may be due to improper initial installation of the pipe, deterioration of the pipe itself due to aging or the effects of corrosive materials, cracking of the pipe or pipe joints due to environmental conditions such as earthquakes or similar natural or man-made vibrations, or any other such causes. Regardless of the cause, such leakage is undesirable, at best, and may result in waste of the fluid being carried by the pipe, damage to the environment and the possible creation of public health hazards.

Because of ever increasing labor and machinery costs, it is becoming increasingly more difficult, at least economically, to dig up nd replace those pipes or portions of pipes which may be leaking. As a result, various methods have been devised for the in situ repair or rehabilitation of the existing pipes, thereby avoiding the expenses and hazards involved in digging up and replacing the pipes. One of the most successful of such repair or rehabilitation processes which has been developed is called the Insituform process, which is described in U.S. Pat. Nos. 4,009,063; 4,064,211; and 4,135,958, the contents of which are incorporated herein by reference.

Briefly, in the Insituform process, an elongated flexible tubular liner comprised of a felt or similar material which is impregnated with a thermal setting synthetic resin is installed within the existing pipe utilizing an inverting process as described in the aforesaid patents. Once the liner is in place within the pipe, the liner is pressurized from within, preferably utilizing a high temperature fluid, to force the liner radially outwardly to engage and conform to the interior surface of the pipe. While the pressure is maintained, the resin is cured to form a relatively hard, tight-fitting, rigid pipe lining which effectively seals any cracks and repairs any pipe or joint deterioration to prevent further leakage either into or out of the pipe.

When such a liner is installed within a pipe, such as a sanitary sewer main, which includes a plurality of connecting service entrances, such as smaller laterals which carry sewage from individual sources into the main pipe, all of the service entrances or laterals are effectively covered over and sealed by the liner. It, therefore, becomes necessary to either gain access to the junctures of the laterals with the main sewer pipe in order to cut holes through the liner, or to provide a remotely controlled means to cut out the portion of the liner that covers over the service or lateral entrances.

The prior art cutter which has been previously employed for this purpose is described in U.S. Pat. No. 4,197,908. While the prior art cutter described in this patent is generally effective in cutting the liner, as required, to port or open the various service entrances or laterals to the main sewer pipe, the prior art cutter is relatively expensive to manufacture and to operate. In addition, the prior art cutter is unreliable, primarily because it is basically electrically powered and electrically controlled, and the moisture laden sewer pipe environment frequently causes the prior art cutter to fail due to electrical short circuits and the like.

The inventor of the present invention developed a hydraulic cutter to overcome the problems of the prior art cutters. The inventor's cutter is disclosed in U.S. Pat. No. 4,630,676, which is incorporated herein by reference.

The present invention provides an improved remotely controlled cutter apparatus which is hydraulically operated and controlled to provide more economical, efficient and reliable service. In addition, the cutter of the present invention is articulatable to provide greater flexibility for use at variable lateral angles.

SUMMARY OF THE INVENTION

Briefly stated, the present invention comprises a remotely controlled, articulatable hydraulically operated cutter apparatus for use within a conduit having an axis, such as a sewer pipe. The cutter apparatus is comprised of control means located outside of the conduit for generating a plurality of control signals for controlling the operation of the cutter apparatus, and a source of pressurized hydraulic fluid. Valve means are provided for receiving pressurized fluid from the fluid source and the control signals from the control means, and for distributing the received hydraulic fluid in accordance with the received control signals. A hydraulically powered cutter motor is located within the conduit and is pivotally supported by means extending along an axis generally perpendicular to the axis of the conduit. The cutter motor includes a cutting tool and is adapted for receiving hydraulic fluid from the valve means for driving the cutting tool.

First hydraulically actuated means are adapted to receive hydraulic fluid from the valve means for axially centering the supporting means within the conduit and for holding the supporting means at a fixed axial position within the conduit as long as the received hydraulic fluid exceeds a predetermined minimum. Second hydraulically actuated means are adapted to received hydraulic fluid from the valve means for varying the axial position of the cutter motor with respect to the supporting means in accordance with the received hydraulic fluid. Third hydraulically actuated means are adapted to receive hydraulic fluid from the valve means for varying the radial position of the cutter motor with respect to the cutter means in accordance with the received hydraulic fluid. Fourth hydraulically actuated means are adapted to receive hydraulic fluid from the valve means for rotating the cutter motor up to 180 degrees about the axis of the conduit in either a clockwise or counterclockwise direction with respect to an initial position in accordance with the received hydraulic fluid. Fifth hydraulically actuated means are adapted to receive hydraulic fluid from the valve means for pivoting the cutter motor about the axis, extending generally perpendicular to the axis of the conduit in accordance with the received hydraulic fluid. The first, second, third, fourth and fifth hydraulically actuated means cooperate to position the cutter motor in accordance with the control signals to facilitate cutting by the cutting tool.

BRIEF DESCRIPTION OF THE DRAWINGS

The foregoing summary, as well as the following detailed description, will be better understood when read in conjunction with the appended drawings. For the purpose of illustrating the invention, there is shown in the drawings embodiments which are presently preferred, it being understood, however, that this invention is not limited to the precise arrangements and instrumentalities shown. In the drawings:

FIG. 1 is a front elevational view of a preferred embodiment of the cutter apparatus of the present invention installed within a subterranean sewer pipe;

FIG. 2 is an enlarged elevational view, partially broken away, of the hydraulic fluid reservoir and hydraulic pump portion of the apparatus of FIG. 1;

FIG. 3 is a sectional view of a portion of the apparatus taken along line 3—3 of FIG. 2;

FIG. 4 is an enlarged top plan view of the valve means portion of the apparatus of FIG. 1;

FIG. 5 is an enlarged elevational view of the valve means portion of the apparatus of FIG. 1;

FIG. 7 is an enlarged side elevational view of the second structural unit of the apparatus of Fig. 1 showing a first use of the cutter;

FIG. 8 is a side elevational view of the second structural unit of the apparatus of FIG. 1 showing the cutter in an alternate use;

FIG. 9 is an enlarged top plan view of a portion of the structural unit shown in FIG. 7;

FIG. 10 is an enlarged side elevational view, partially broken away, of the portion of the structural unit shown in FIG. 9;

FIG. 13 is a top plan view, partially in section, of a portion of the structural unit shown in FIG. 9;

FIG. 14 is a side elevational view, partially in section, of the portion of the structural unit shown in FIG. 9;

DESCRIPTION OF PREFERRED EMBODIMENT

Figure 6:
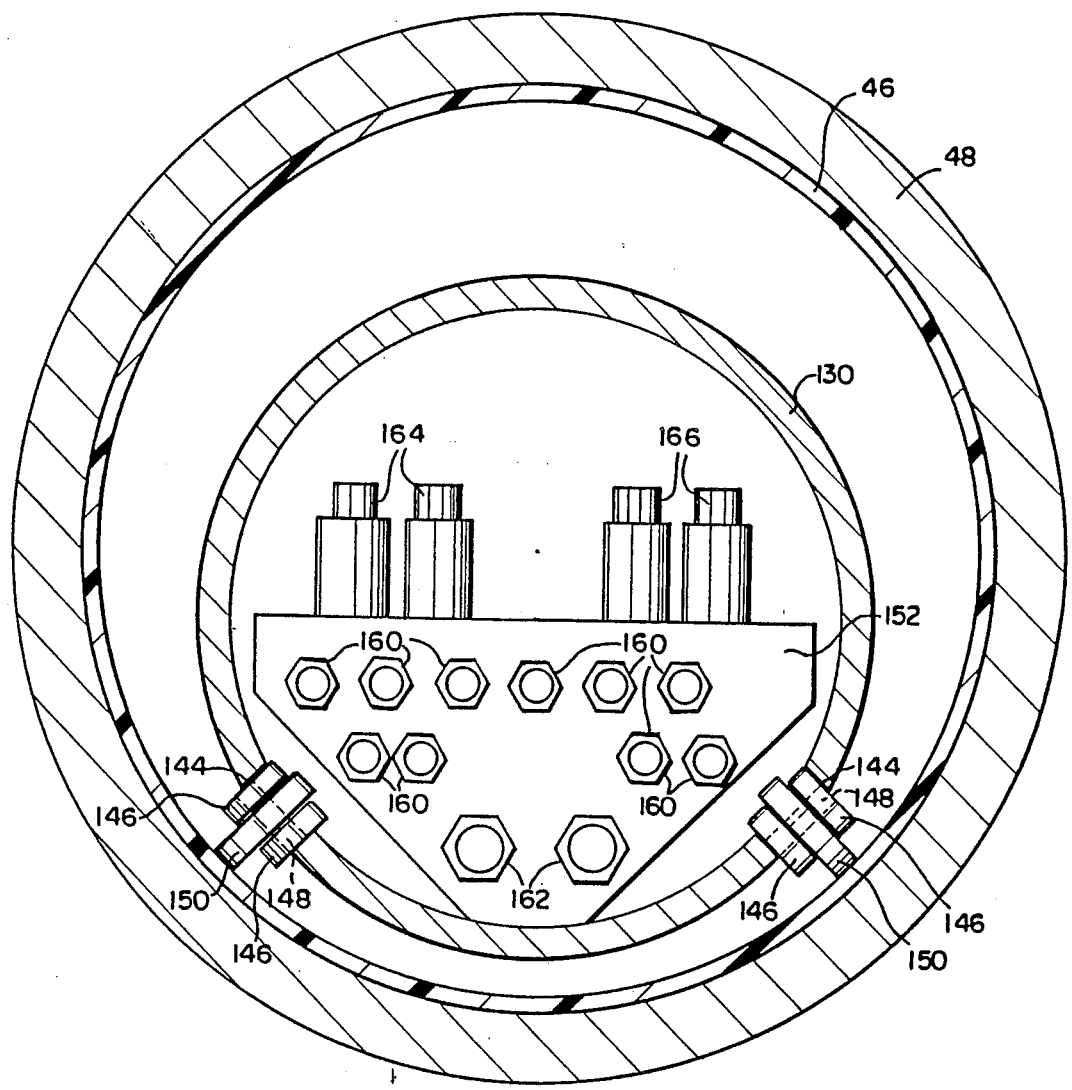
FIG. 6 is a sectional view of a portion of the apparatus taken along line 6—6 of FIG. 4.

Referring to FIG. 1, there is shown a schematic representation of a remotely controlled, hydraulically operated cutter apparatus indicated generally as 30. The cutter apparatus 30 of the present invention is comprised of four separate structural units or assemblies 32, 34, 36 and 38, which are sequentially coupled or attached together end-to-end for concurrent movement in a manner which will hereinafter become apparent. Each structural unit 32, 34, 36 and 38 includes one or more functional subassemblies of the cutter apparatus 30, as will hereinafter be described in greater detail. The cutter apparatus 30 further comprises a fifth structural unit or control assembly 40 which is positioned in a location remote from the other four structural units 32, 34, 36 and 38, and is connected thereto by suitable connecting means, such as one or more multiple conductor electrical cables 42 and 44. Further details concerning the structure and operation of the control assembly 40 will hereinafter be presented.

In the presently preferred embodiment, the cutter apparatus 30 is indicated as being employed for the purpose of locating and cutting through a portion of a liner, preferably an Insituform thermal setting plastic liner 46, which has previously been installed and cured within a conduit or pipe, for example, an underground or otherwise inaccessible conduit shown in the present embodiment as sewer pipe 48. As discussed briefly above, the cutter apparatus 30 may be employed for locating and cutting through a portion of the liner 46, which may be blocking or partially blocking the entrance to a connecting service pipe or lateral 50, and thereby may be preventing the free flow of sewage or the like therethrough. Alternatively, the cutter apparatus 30 may be employed for trimming off the ends of a liner (not shown) which has previously been installed in a service pipe or lateral.

In the present embodiment, for the purpose of illustrating the operation of the cutter apparatus 30, the lateral 50 is shown as being connected to the sewer pipe 48 from above and at an angle of approximately 60 degrees from the axis of the sewer pipe. However, it will be appreciated by those skilled in the art that the lateral could enter the sewer pipe at any other position around the circumference of the sewer pipe or at any other angle with respect to the axis of the sewer pipe. In fact, in many instances, the lateral will be generally level with or slightly above the sewer pipe and at about a 90 degree angle with respect to the axis of the sewer pipe.

The cutter apparatus 30 is particularly useful in connection with sewer pipes or other conduits having a relatively small diameter, on the order of 7½ inches inside diameter, a size which is insufficient to permit the cutting of the liner 46 in any other conventional manner, without having to dig up the sewer pipe 48. Due to the relatively small size of the sewer pipe 48, the outside dimensions of the four structural units, 32, 34. 36, and 38, may not exceed 5 and ⅝ inches in diameter in order to provide sufficient clearance for movement along the sewer pipe 48 without damaging the cutter apparatus 30 or the liner 46.

The first structural unit 32 is located at the front or forward end (left side when viewing FIG. 1) of the cutter apparatus 30 and includes an audio subassembly and a television or video subassembly which includes a video camera. The camera and video subassembly are employed to determine the location of a service pipe or lateral 50 which is blocked by the liner 46, or to locate a portion of a lateral liner (not shown) which extends into the sewer pipe 48. Thereafter, the camera and video subassembly may be utilized in conjunction with the audio subassembly to serve as the "eyes" and "ears"

of an operator located on the surface who is monitoring and/or controlling the cutting of the portion of the liner 46 which is blocking the lateral 50 or the portion of the lateral liner extending into the sewer pipe 48.

The camera and video subassembly and the audio subassembly are substantially the same as those employed in the prior art for substantially the same purpose. Subassemblies of this type are well known in the art and are generally commercially available. More specific details of the structure and operational features of the camera and video subassembly and the audio subassembly are not believed to be necessary for a complete understanding of the present invention, and, therefore, will not be presented herein. Suffice it to say that both the camera and video subassembly and the audio subassembly are suitably contained within a suitably sized housing (not shown) of the first structural unit 32 for movement and operation along with the remainder of the cutter apparatus 30 in a manner which will hereinafter become apparent.

The second structural unit 34 incorporates three functional subassemblies. The forward (leftmost when viewing FIG. 1) portion of the second structural unit 34 contains the cutter supporting subassembly 52 containing a cutter 54 which is employed to do the actual cutting of the liner 46. The cutter 54 is comprised of a cutter motor, cutting tool, cutter housing and other components which will hereinafter be described in greater detail. The second structural unit 34 also includes a holder subassembly 56 which is employed to hold or secure the second operational unit 34 in a fixed, axial position within the sewer pipe 48 during the liner cutting operation. In addition, as will hereinafter be described, the holder subassembly 56 functions to position and align the second structural unit 34 generally along the axial center line of the sewer pipe 48 to facilitate proper positioning of the cutter tool 54. The holder subassembly 56 includes first hydraulically actuated means (not shown in FIG. 1) for receiving pressurized hydraulic fluid and for centering and holding the second structural unit at a fixed axial position and centered within the sewer pipe, as long as the received hydraulic fluid exceeds a predetermined minimum pressure.

The second structural unit 34 further includes a cutter positioning subassembly 58 for moving the cutter supporting subassembly 52 and the cutter 54 to permit cutting of the liner 46 around the entire area of the connecting lateral 50. In the present embodiment, the cutter positioning subassembly 58 includes second hydraulically actuated means for receiving pressurized hydraulic fluid and for adjusting the axial position of the cutter supporting subassembly 52 and the cutter 54 forward and rearward within the sewer pipe 48 (toward the left and right, respectively, when viewing FIG. 1) approximately eleven inches, and third hydraulically actuated means for receiving pressurized hydraulic fluid and for cooperating with the cutter supporting subassembly 52 for adjusting the radial position of the cutter 54 inwardly and outwardly approximately five and one-half inches with respect to the sewer pipe 48.

The cutter positioning subassembly 58 further comprises fourth hydraulically actuated means for receiving pressurized hydraulic fluid and for rotating the cutter supporting subassembly 52 approximately 180 degrees, either clockwise or counterclockwise, from its starting or storage position (twelve o'clock position when looking along the axis of the sewer pipe 48) to permit the cutting of the liner 46 at various positions around the circumference of the sewer pipe 48.

Fifth hydraulically actuated means are also included for receiving pressurized fluid and for articulating the cutter 54 with respect to the cutter supporting subassembly 52 through approximately 90 degrees of forward or rearward articulation to permit the cutting of the liner 46 in accordance with any angle of the lateral 50 with respect to the axis of the sewer pipe 48.

The third structural unit 36 includes valve mean or a hydraulic valve subassembly 60 (not shown in FIG. 1) which received hydraulic fluid under pressure and directs or distributes the hydraulic fluid in accordance with received control signals through a plurality of conduits or hydraulic hoses (not shown in FIG. 1) for actuation of the cutter 54, the holder subassembly 56 and the cutter positioning subassembly 58.

The fourth structural unit 38 comprises a source of pressurized fluid, preferably hydraulic fluid, and includes a hydraulic pump (not shown in FIG. 1) and a hydraulic fluid reservoir (not shown in FIG. 1). The hydraulic fluid pump and hydraulic fluid reservoir cooperate to provide a supply of hydraulic fluid under pressure to the hydraulic valve subassembly 60 of the third structural unit 36 for subsequent distribution, as previously described and as will hereinafter be described in greater detail.

The previously described first four structural units 32, 34, 36 and 38 are the operational units which are installed within the sewer pipe 48 to accomplish the actual cutting of the liner 46. As previously indicated, the fifth structural unit or control assembly 40 is generally physically located outside of the sewer pipe, preferably on the surface, as shown in FIG. 1. The control assembly 40 generates a plurality of control signals, preferably electrical signals, to provide a means for an operator to remotely control the entire operation of the cutter apparatus 30 within the sewer pipe 48 from the surface. The control assembly 40 also receives signals from the camera and video subassembly and the audio subassembly along cable 44 to assist the operator in controlling the in-ground cutting operation.

In the operation of the cutter apparatus 30, the first four structural units 32, 34, 36 and 38 are initially installed within the sewer pipe 48 by way of conventional downstream manhole 62 and upstream manhole 64, typically four feet in inside diameter. The four operational units 32, 34, 36 and 38 are attached together end-to-end for cooperative movement along the sewer pipe 48, using flexible or bendable attachment means, as will hereinafter be described, to give the apparatus 30 sufficient flexibility to permit the various units to be manipulated around curves or dips within the sewer pipe 48.

The forward or front (left) end of the first structural unit 32 includes suitable attachment means, such as an eye bolt (not shown in FIG. 1), for attaching a suitable movement means, such as a steel cable 66 for pulling the interconnected operational units 32, 34, 36, and 38 forward (toward the left) along the sewer pipe 48. Correspondingly, the back or rear (right) end of structural unit 38 includes a similar attachment means for attaching a similar movement means, such as steel cable 66 to permit the connected structural units 32, 34, 36 and 38 to be pulled along the sewer pipe 48 in the other (right) direction. The steel cables 66 and 68 may be manually pulled in either direction by an operator located within the manhole, or by utilizing suitable pulleys by an operator on the surface. Alternatively, the steel cables may be connected to suitable mechanical winch means (not shown) which may be hand- or motor-driven, and which may be located within the manholes 62 and 64 or on the surface.

Once the operational units 32, 34, 36 and 38 are installed within the sewer pipe 48, the camera and video subassembly are activated to survey or scan the interior surface of the sewer pipe 48 to provide a visual display for the operator. The operational units 32, 34, 36 and 38 are slowly pulled forward along the sewer pipe (toward the left when viewing FIG. 1) by cable 66. The video camera scans the interior of the sewer pipe 48 until the presence of a service pipe or lateral 50 is detected. The presence of a lateral 50 is easy to detect because when the thermal setting liner 46 is installed within the sewer pipe 48, a depression or dimple is formed over the lateral opening due to the pressures imposed upon the liner during curing and the lack of support over the lateral opening. Thus, the presence of a generally circular dimple or indentation having a diameter which approximates that of a service pipe or lateral 50 within the liner 46 indicates the presence of a connecting lateral 50 which must be opened to permit the free flow of sewage into the sewer pipe 48.

When a dimple is located, the operational units 32, 34, 36 and 38 are pulled to a position in which the cutter 54 is approximately 2 inches downstream (toward the right when viewing FIG. 1) from the leading edge of the dimple. The holder subassembly 56 is activated as described in greater detail below to center and lock the second structural unit 34 in place within the sewer pipe 48. The cutter 54 is maneuvered into position for cutting through the dimple, as shown in FIG. 1. Manipulation of the cutter may involve rotating the cutter positioning subassembly 58 in either rotational direction or moving the cutter positioning subassembly axially along the sewer pipe in a manner which will hereinafter be described. In addition, the cutter may be moved radially outwardly to bring the actual cutting head into engagement with the liner dimple and the cutter may be articulated in a manner which will hereinafter be described to compensate for the angle of the lateral 50 with respect to the sewer pipe 48. Movement of the cutter supporting subassembly 52 and the cutter 54 is controlled by the operator while continuously observing the position of the cutter 54 on a video display located at the control assembly. In addition, the sound from the cutter 54, as conveyed to the operator by the audio subassembly is helpful in monitoring the cutting operation.

Initially, a small hole is cut through the dimpled portion of the liner 46 to confirm the presence of a lateral 50 and to permit fluid or other materials which have been trapped and have accumulated within the lateral 50 to drain into the sewer pipe 48 and away from the cutting operation. Once the drainage of the lateral 50 has been completed, the remainder of the dimpled portion of the liner 46 is cut away by the operator manipulating the cutter 54 so that it moves completely around the lateral opening. Again, the operator can observe the progress of the cutter 54 on the visual display and can hear the cutting as it is accomplished.

Once the lateral 50 is completely open to the sewer pipe 48, the cutter 54 is moved radially inwardly and is otherwise returned to its starting or storing position. The holder subassembly 56 is disengaged from the sewer pipe 48 and the operational units 32, 34, 36 and 38 are pulled further along the sewer pipe 48 until another depression or dimple is located. The cutting operation is repeated along the entire length of the sewer pipe 48 until the liner 46 is cut away from all service pipes or laterals along the sewer pipe 48. As best seen in FIG. 8, the present invention is also adapted for cutting protruding taps or protruding ends of the liner of a service lateral.

The foregoing general discussion was included to provide a basic understanding of the structure and operation of the cutter apparatus 30. It is believed that this basic understanding will facilitate a better understanding of the more detailed discussion of the structural and operational features of each of the various subassemblies of the cutter apparatus 30 which will hereinafter be presented. In order to further clarify the detailed description of the various subassemblies, each structural unit will be separately described, starting with the fourth or rearmost structural unit 38.

Pressurized Hydraulic Fluid Source

Referring now to FIGS. 2 and 3, there is shown in greater detail the structural features of the pressurized hydraulic fluid source or hydraulic fluid pump subassembly contained in structural unit 38. Structural unit 38 includes an elongated generally cylindrical or tubular housing 70 and six generally circular bulkheads 72, 74, 76, 78, 80 and 82 positioned at spaced locations along the tubular housing 70 for purposes which will hereinafter become apparent. The six bulkheads 72, 74, 76, 78, 80 and 82 are secured to the housing 70 by any suitable means, for example, screws or bolts or welding (not shown) around the circumference of the housing 70. Preferably, both the housing 70 and the bulkheads 72, 74, 76, 78, 80 and 82 are formed of a steel alloy, but could be formed of any other suitable light-weight, high strength material. The housing 70 also includes two pairs of wheel assemblies 84 positioned proximate the forward and rear ends to facilitate movement of the housing 70 along the sewer pipe 48 without damaging the liner 46. Attachment means, in the present embodiment a pull ring or eye bolt 86 is secured to the rear or back end of the rearmost bulkhead 82 The steel cable 68 employed for pulling the apparatus 30 rearwardly (see FIG. 1) is secured to the pull ring 86. Another attachment means, in the present embodiment a clevis rod member 88 extends outwardly from the forward end of the forwardmost bulkhead 72 for attaching the fourth structural unit 388 to the third structural unit 36 in a manner which will hereinafter become apparent.

In the present embodiment, the pressurized hydraulic fluid source includes both a hydraulic fluid reservoir 90 and a hydraulic pump 92. The pump 92, which is of a conventional, commercially available type, is generally cylindrical and is secured within a generally circular opening (not shown) extending through bulkhead 76. Means are provided for driving the pump 92, in the present embodiment, a conventional electric motor 94, which is also generally cylindrical. The output shaft 96 of motor 94 is connected to the drive shaft 98 of pump 92 by suitable means, for example, coupling 100. The electric motor 94 is of a type commercially available from various suppliers and is heavily insulated and explosion proof to permit safe operation in the sometimes moisture laden, gas filled environment present within a sewer pipe 48. The motor 94 is suitably supported within suitably sized generally circular openings extending through bulkheads 78 and 80 and is secured therein, utilizing suitable securing means, such as bolts or screws (not shown).

A detailed description of the structure and/or operation of the hydraulic pump 92 and the electric motor 94 is not necessary for complete understanding of the present invention, and therefore will not be presented. Such information may be obtained from the various manufacturers which produce and sell such pumps and motors. Suffice it to say that upon the application of electrical current, the armature of the electric motor 94 is driven to rotate in the usual manner, thereby rotating output shaft 96 and, through coupling 100, the input shaft 98 of the pump 92. The input shaft of the pump is drivingly connected to a rotatable impeller or the like (not shown) within the pump 92. The rotation of the pump impeller pressurizes and propels hydraulic fluid, as will hereinafter be described to provide the required hydraulic power for the operation of the cutter apparatus 30.

The multiple conductor electrical cable 42 (FIG. 1) from the control assembly 40 is split proximate the rear end of the fourth structural unit 38 into two electrical cables 102 and 104. Cable 102 is passed through a suitable opening in the rear bulkhead 82 and is electrically connected to the motor 94 to provide power for the operation thereof. Cable 104 is employed for providing electrical control signals to the hydraulic valve subassembly 60 (not shown in FIGS. 2 or 3) in a manner which will hereinafter be described. A suitable control cable conduit 106 extends from the rear end to the forward end of the fourth structural unit 38, passing through each of the bulkheads 72, 74, 76, 78, 80 and 82. The control cable conduit 106 which may be made of steel or any other suitable high strength material is sealingly secured to the various bulkheads by suitable means, for example, by welding. In this manner, the control cable 104 may pass unimpeded through the control cable conduit 106 for connection to the third structural unit 36, as will hereinafter be described.

The hydraulic fluid reservoir 90 is generally cylindrical and is defined by the housing 70 and bulkheads 72 and 74, each of which is sealingly secured to the housing 70. The hydraulic fluid reservoir 90 contains a quantity of hydraulic fluid sufficient to hydraulically control the positioning of the cutter supporting subassembly 52 and cutter 54 and to drive the cutter 54, as will hereinafter be described in greater detail. Hydraulic fluid is installed into the fluid reservoir through a conveniently located fill tube 108, which is suitably covered and sealed, for example, with a cap 110. In the present embodiment, the fill tube 108 is located at the forward end of the reservoir 90 and extends through bulkhead 72. The fluid level in the reservoir 90 is periodically checked and the reservoir is refilled, if necessary, prior to the installation of the apparatus 30 within the sewer pipe 48.

The fluid reservoir 90 includes a fluid port 112 which is connected by a suitable fluid conduit or hose 114 to the fluid intake side of hydraulic pump 92. The fluid output side of the hydraulic pump 92 from which the pressurized fluid emerges is connected to another fluid conduit or hose 116 which extends forward (toward the left when viewing FIG. 2) through the fluid reservoir 90 for providing a continuous supply of hydraulic fluid under pressure to the hydraulic valve subassembly 60. A suitable protective sleeve 118 surrounds conduit 114 within the reservoir 90 to prevent inadvertent leakage of pressurized hydraulic fluid. The fill tube 108 includes a "T" fitting 122, one leg of which is attached to a fluid return conduit or hose 120 for returning fluid to the reservoir from the hydraulic valve subassembly 60. The fluid conduits or hoses which are employed in the present embodiment of the invention are flexible and lightweight, but yet are strong enough to accommodate and conduct high pressure hydraulic fluid for extended periods of time. Such hoses are generally fabricated of synthetic rubber with fabric braid reinforcement and may be commercially purchased.

Operation of the hydraulic fluid subassembly is relatively straightforward. When electrical power is received by the motor 94, it is activated to turn the hydraulic pump 92 to pump hydraulic fluid under pressure through the fluid output conduit 116 for various uses, as will hereinafter be described in greater detail. After the pressurized fluid has been utilized, it is returned for reuse to the fluid reservoir 90 through the return conduit 120.

Hydraulic Fluid Control Subassembly

Referring now to FIGS. 4, 5 and 6, there is shown in greater detail the third structural unit 36 which includes the valve means or hydraulic valve subassembly 60. The primary purpose of the hydraulic valve subassembly 60 is to receive pressurized hydraulic fluid from the hydraulic fluid pump subassembly of structural unit 38 and to distribute and direct portions of the pressurized fluid in accordance with control signals received from the control assembly 40. The pressurized fluid is directed through a plurality of conduits or hydraulic hoses to vary the position of the cutter 54 and cutter supporting subassembly 52 and to provide hydraulic power to the cutter 54. As best seen in FIGS. 4 and 5, the third structural unit 36 includes a generally cylindrical or tubular housing 130 with a generally circular bulkhead 132 and 134 secured at each axial end. In the present embodiment, the tubular housing 130 and the bulkheads 132 are formed of a steel alloy, but they could be formed of any other suitable high strength material. The bulkheads 132 and 134 may be secured to the tubular housing utilizing screws or bolts (not shown) or in any other suitable manner.

A clevis member 136 is secured to the rear bulkhead 134 and is adapted to be coupled to the clevis rod member 88 on the forward end of structural unit 38 (FIG. 2), utilizing a suitable clevis pin (not shown). In this manner, structural unit 36 is flexibly coupled to structural unit 38 to facilitate movement of the two structural units 36 and 38 into and out of the sewer pipe and around turns or bends in the sewer pipe 48. Means (not shown) are provided for retaining the clevis pin in place to prevent the two structural units 36 and 38 from inadvertently becoming uncoupled within a sewer pipe 48.

A pair of clevis rod members 138 are secured to the outer surface of the forward bulkhead 132. A pair of elongated clevis linking members 140 are connected on one end to the clevis rod members 138, utilizing suitably sized clevis pins 142. The other ends of the clevis linking members 140 are adapted to be similarly connected to the rear end of the second structural unit 34, as will hereinafter become apparent. Means (not shown) are provided for retaining the clevis pins 142 in place to prevent inadvertent uncoupling of the clevis linking members 140 from the clevis rod members 138. The clevis linking members 140 are of a predetermined length to maintain a predetermined spacing between the second and third structural units 34 and 36.

As with the previously described structural unit 38, the third structural unit 36 includes wheel assemblies 144 positioned at both the forward and rearward ends of the housing 130 on both lateral sides to facilitate movement of the structural unit 36 along the sewer pipe 48. As best shown in FIG. 6, the wheel assemblies 144 include support members or support blocks 146 which are adapted to support generally cylindrical axle members 148. The axle members 148, in turn, support freely rotating wheel members 150.

The hydraulic valve subassembly 60 further includes a manifold means or manifold component having a housing 152 and a plurality of valve means or valves, in the present embodiment, electrically operated solenoid valves collectively referred to as 154. The manifold housing 152 is preferably formed of a lightweight metallic alloy, such as aluminum, and is secured to the tubular housing 130 by any suitable means, such as bolts or screws (not shown). The rearward end of the manifold housing 152 includes a pressurized fluid inlet port and connector assembly 156, to which is connected the other end of pressurized fluid hose 116 and a fluid return port and connector 158, to which is connected fluid return hose 120.

The forward end of the manifold housing 152 includes a plurality of fluid transfer ports, each of which includes a connector to permit attachment of a conduit or hose. In the present embodiment, as best seen in FIG. 6, the manifold housing 152 includes ten transfer ports and connectors, collectively shown as 160, and having a first predetermined diameter and two transfer ports and connectors 162 of a second predetermined diameter greater than that of the first predetermined diameter. The manifold housing 152 also contains a plurality of internal connecting conduits (not shown) which can be interconnected by the actuation of some of solenoid valves 154 to direct pressurized fluid received through the pressurized fluid inlet port 156 out of some of the transfer pots 160 and 162 for the movement and operation of the cutter 54. In a similar manner, upon actuation of others of solenoid valves 154, the internal connecting conduits of the manifold housing 152 direct return hydraulic fluid through various other transfer ports 160 and 162 to the return fluid port 158.

In the present embodiment, four individual solenoid valves are utilized for controlling each type of movement of the cutter supporting assembly 52 and the cutter 54 and four solenoid valves are utilized for providing hydraulic fluid to power the cutter 54. In the present embodiment, the four solenoid valves indicated as 164 are employed for directing pressurized fluid for powering the cutter apparatus and for directing return fluid from the cutter apparatus, solenoid valves 166 direct fluid for articulation of the cutter 54, and solenoid valves 168 direct fluid for axial movement of the cutter supporting subassembly 52. Similarly, solenoid valves 170 direct hydraulic fluid for rotation of the cutter supporting subassembly, solenoid valves 172 direct fluid for radial inward and outward movement of the cutter 54, and solenoid valves 174 direct fluid to the holder subassembly 56 for centering and retaining the second structural unit 34 at a fixed location within the sewer pipe 48. The solenoid valves employed in the present embodiment are of a type well known in the art and commercially available from various suppliers.

An electrical cable distribution panel 176 is secured to the upper surface of the rear end of the manifold housing 152. The control cable 104 is secured to the rear end of the electrical cable distribution panel 176 by any suitable means, for example, a suitable electrical connector assembly 178. Means (not shown) are provided within the electrical cable distribution panel 176 for interconnecting the various conductors of the control cable 104 through suitable control wire outlets 180 and along suitable wires, shown collectively as 182, to the various solenoid valves 154. For the sake of clarity, only two sets of interconnecting wires 182 are shown in FIG. 4, it being understood that similar sets of wires are secured to the remainder of solenoid valves 154. In this manner, electrical signals from the control assembly 40 may be directed through cables 42 and 104, through electrical cable distribution panel 176, and through control wires 182 for actuation of each of the individual solenoid valves 154. By actuating the individual solenoid valves 154 in combination, as will hereinafter be described, hydraulic fluid is directed through the various transfer ports 160 and 162 for operation of the cutter apparatus 30, as described above.

Attached to each of the manifold housing transfer ports 160 and 162 are a corresponding plurality of fluid conduits or hydraulic hoses, shown collectively as 184, employed for the purpose of conducting the hydraulic fluid flowing from the various transfer ports away from or toward the manifold housing 152. The hydraulic hoses employed in the present embodiment are small (approximately one-half inch in outside diameter) and lightweight, and yet capable of withstanding the hydraulic pressure and conducting the hydraulic fluid without leakage over extended periods of time, during which the cutting operation is being conducted within the sewer pipe 48. Hydraulic hoses of this type are primarily fabricated out of synthetic rubber, with fabric braid reinforcement, which provides the necessary strength and flexibility. In the present embodiment, the hydraulic hoses 184, extend between the manifold housing 152 and the second structural unit 34.

Referring now to FIGS. 7 through 17, there is shown in greater detail various aspects of the second structural unit 34. As previously indicated, the second structural unit 34 is comprised of three primary subassemblies—the cutter-supporting subassembly 52, the holder subassembly 56 and the cutter-positioning subassembly 58. For the sake of clarity, the structural and operational features of these three subassemblies will be separately shown and described, it being clearly understood that all three subassemblies are contained within a single structural unit 34.

Referring now to FIGS. 7 and 8, the second structural unit 34, along with portions of the three functional subassemblies 52, 56 and 58 contained therein, are shown in greater detail. Structural unit 34 includes a generally tubular outer housing 190 and a generally tubular inner housing 192, the inner housing being adapted to move axially with respect to the outer housing 190 for axial movement of the cutter 54 in a manner which will hereinafter become apparent. A generally circular bulkhead 194 is secured to the rearward (rightward) end of the outer tubular housing 190. A pair of clevis rod members 196 (only one of which is shown in FIGS. 7 and 8) extend rearwardly from the bulkhead 194. The clevis rod members 196 are adapted to be secured to the forward ends of clevis linking members 140 (see FIGS. 4 and 5) by suitable clevis pins (not shown) for securing the second structural unit 34 to the third structural unit 36 for concurrent movement through the sewer pipe 48. The forward (leftward) end of the outer tubular housing 190 includes a pair of pull rings or eye bolts 198 (only one shown in FIGS. 7 and 8) for attachment of a cable (not shown in FIGS. 7 and 8) for securing the second structural unit 34 to the first structural unit 32 for concurrent movement through the sewer pipe 48.

FIG. 7 illustrates the use of the cutter 54 for cutting through a portion of a liner 46 which has been installed within a main sewer pipe 48 and which is blocking the opening from a connecting service pipe or lateral 50. FIG. 8 shows the cutter with a different cutting tool being employed for trimming off the protruding end of a lateral liner 51 which has previously been installed within a lateral 50 and which is extending into the main sewer pipe 48. As will hereinafter become apparent, no matter what function the cutter 54 is performing, structural unit 34 is centered within the sewer pipe 48 and is locked in position by the holder assembly 56.

Holder Subassembly

Figure 11:
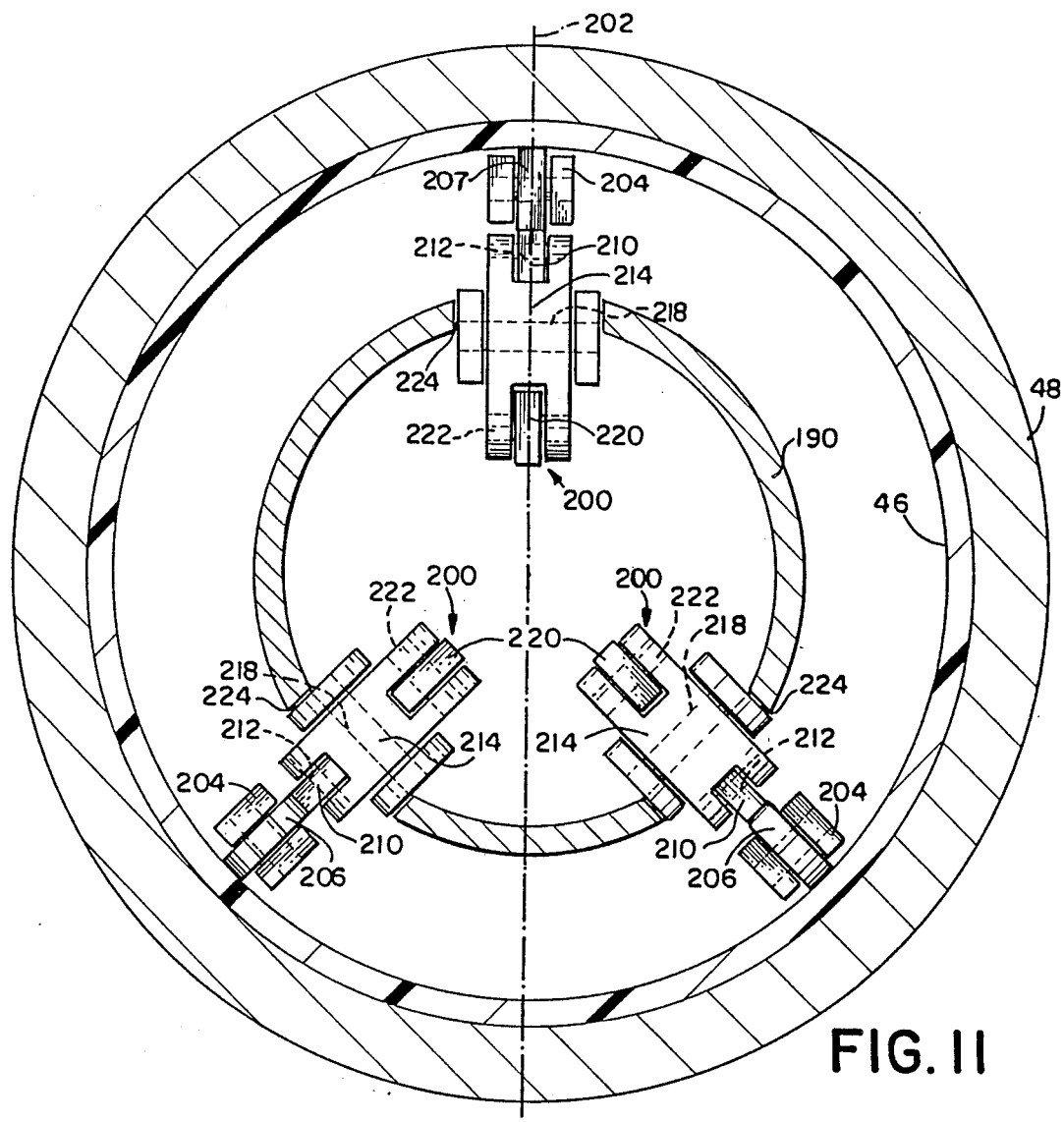
FIG. 11 is an enlarged front end view of the portion of the structural unit shown in FIG. 10.
Figure 12:
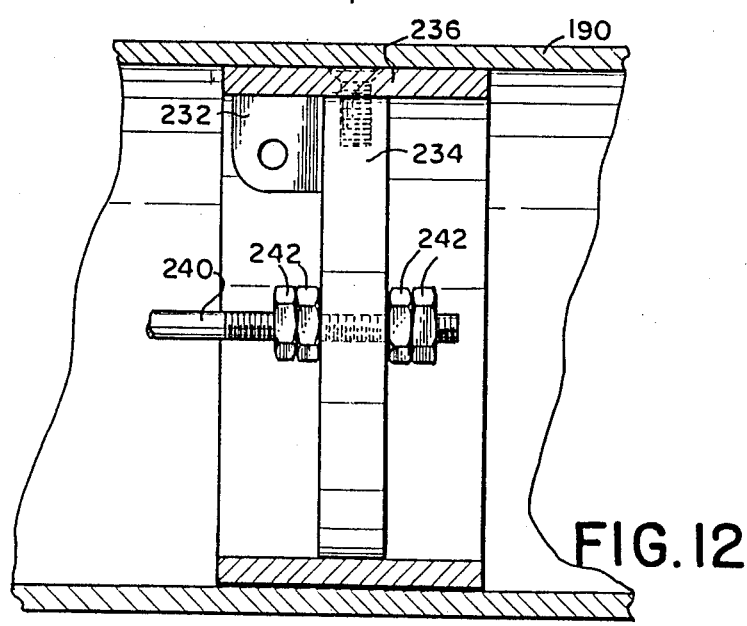
FIG. 12 is a greatly enlarged side elevational view, partially in section, of a portion of the structural unit shown in FIG. 10.

Referring now to FIGS. 9 through 12, there is shown in greater detail the structural features of the holder subassembly 56. In the present embodiment, the holder assembly 56 is comprised of three individual supporting skid subassemblies 200, which are spaced around the outer tubular housing 190, as shown in FIG. 11. As shown in FIG. 11, the two supporting skid subassemblies 200 on the lower portion of the outer housing 190 are approximately 90 degrees apart, each supporting skid subassembly 200 being approximately 45 degrees from a vertical axis line 202 extending through the center of the outer housing 190. The third supporting skid subassembly 200 is generally spaced about 135 degrees from either of the other two supporting skid subassemblies 200 and extends generally along the vertical axis line 202.

The three supporting skid subassemblies 200 are interconnected in a manner, which will hereinafter be described, for concurrent inward and outward radial movement with respect to the outer housing 190. As will hereinafter become apparent, the supporting skid subassemblies 200 cooperate for elevating the outer tubular housing 190 within the sewer pipe 48, for generally centering the outer tubular housing 190 along the central axis of the sewer pipe 48 (see FIG. 11) and for holding the outer housing 190 securely in place at a fixed axial location within the sewer pipe 48. For the sake of brevity and clarity, only one of the supporting skid subassemblies 200 will be described in detail, it being understood that the other two supporting skid subassemblies 200 are structurally and operationally the same.

Referring again to FIGS. 9 and 10, it can be seen that the single illustrated supporting skid subassembly 200 comprises an elongated supporting skid member 204 extending axially along the major portion of the length of the outer tubular housing 190. The two supporting skid members 204 along the lower portion of the outer housing 190 each include a pair of wheels 206, one of which is rotatably supported by a suitable axle 208 proximate each end of the two supporting skid members 204. The wheels 206 are adapted for supporting the tubular housing 190 to facilitate axial movement along the sewer pipe 48, as previously described. The third skid member 204 includes a pair of frictional contact members 207 proximate each end for providing frictional contact between the skid members 204 and the liner 46. Preferably, the supporting skid members 204 are fabricated of steel or some other high strength material.

Each supporting skid member 204 includes a pair of radially inwardly extending spaced lug members 210. The lug members 210 include suitable openings 212 (FIG. 11) which permit the lug members 210 to be pivotally secured to a first leg of a corresponding pair of bell crank members 214 utilizing a suitably sized pin 216. The bell crank members 214 are pivotally secured to the outer tubular housing 190 by pin members 218. The other leg of each of the bell crank members 214 is pivotally secured at spaced positions along the length of a generally elongated power transmission member 220, utilizing suitable pin members 222. As best seen in FIG. 11, the bell crank members 214 are generally wider than either the lug members 210 or the power transmission member 220, so the ends of the bell crank members 214 extend around the lug members 210 and power transmission member 220 to form a generally standard clevis-type connection. Suitable openings 224 are provided within the outer tubular housing 190 to facilitate connection of the supporting skid member 204 which is located on the outside of the outer tubular housing 190 and the power transmission member 220 which is located within the outer housing 190.

Referring again to FIGS. 9 and 10, the rearmost (rightmost) end of the power transmission member 220 is pivotally connected to the first end of a linking member 226, utilizing a suitable pin member 228. The other or rearward end of the linking member 226, in turn, is similarly pivotally connected by a pin member 230 to a generally axially extending lug member 232. The lug member is secured to the forward end of a generally circular spider member 234, which is supported by a generally cylindrical tubular power member 236. For purposes which will hereinafter become apparent, the tubular power member 236 has an outer diameter which is slightly less than the inner diameter of the outer tubular housing 190 so that the tubular power member 236 may move axially within the outer housing 190.

FIG. 10 demonstrates the supporting skid subassembly 200 in two positions; the upper portion of FIG. 10 shows the support skid subassembly 200 in the radially outwardly extended or holding position, and the lower portion of FIG. 10 shows the supporting skid subassembly in the withdrawn or travelling position. As shown in FIG. 10, forward movement of the spider member 234 and tubular power member 236 results in corresponding forward movement of the power transmission member 220. Forward movement of the power transmission member 220 causes each of the bell crank members 214 to pivot in a clockwise direction about their respective pin members 218, causing the lug member 210 and the supporting skid member 204 to move radially outwardly to the holding position, as shown in the upper portion of FIG. 10. Correspondingly, rearward movement of the spider member 234 and tubular power member 236 causes a corresponding rearward movement of the power transmission member 220, which results in the bell crank members 214 pivoting in a counterclockwise direction, thereby moving the lug members 210 and the supporting skid member 204 radially inwardly to the traveling position as shown in the bottom portion of FIG. 10.

Forward and rearward movement of the spider member 234 and the tubular power member 236 is accomplished by a first hydraulically actuated means, in the present embodiment, a first hydraulic cylinder 238 which is secured to the outer housing 190 in a manner not shown in FIG. 10. The first hydraulic cylinder 238 is of a type well known in the art and generally commercially available. Specific details of the structure and operation of the first hydraulic cylinder 238 are well known and will not be presented herein. Suffice it to say that upon the application of pressurized hydraulic fluid to the first hydraulic cylinder 238, the fluid causes a piston (not shown) within the cylinder 23 to displace axially within the cylinder 238, either toward the left or toward the right when viewing FIG. 10, depending upon which side of the piston receives the pressurized hydraulic fluid. A piston rod 240 which is attached to the piston extends through a suitably sealed opening (not shown) in the rear end of the hydraulic cylinder 238 for concurrent movement with the piston. The distal end of piston rod 240 is secured to the spider member 234 utilizing suitable securing means, such as lock nuts 242 (see FIG. 12). Hydraulic fluid for actuation of the first hydraulic cylinder 238 is supplied along two of the hydraulic hoses 184 extending from the third structural unit 36 to the second structural unit 34, as previously described. Thus, when the supporting skid members 204 are to be extended radially outwardly, hydraulic fluid is supplied to the rearward end of the first hydraulic cylinder 238, moving the piston and piston rod 240 toward the right when viewing FIG. 10, to correspondingly move the spider member 234 and cylindrical power member 236 axially forward. For retracting the support skid members 204 as shown in the lower portion of FIG. 10, hydraulic fluid is supplied to the forward (leftward) end of the first hydraulic cylinder 238, moving the piston and piston rod 240 rearwardly (toward the right) to move both the spider member 234 and tubular power member 236 rearwardly and the supporting skid member 204 inwardly. The first hydraulic cylinder 238 may include a biasing means, such as a spring (not shown), which biases the piston and piston rod 240 rearwardly when viewing FIG. 1. In this manner, if there is a loss of hydraulic fluid pressure or some other problem with the cutter apparatus 30, the bias of the spring causes the piston and piston rod 240 to move rearwardly, causing the spider member 234 and power member 236 to correspondingly move rearwardly to retract the supporting skid members 204, thereby permitting the cutter apparatus 30 to be withdrawn from the sewer pipe 48 for repairs or adjustment.

Cutter Positioning Subassembly

Referring now to FIGS. 13 through 18, there is shown in greater detail some aspects of the cutter positioning subassembly 58. As previously indicated, the cutter positioning subassembly 58 is adapted for adjusting the position of the cutter 54 to facilitate cutting of the liner 46. Thus, the cutter positioning subassembly 58 provides for axial, radial, rotational and pivoting movement of the cutter 54, as will hereinafter be described in greater detail.

FIG. 13 shows a partial sectional view of portions of the second structural unit 34, including outer tubular housing 190 and inner tubular housing 192. Four generally circular bulkheads 250, 252, 254 and 256 are positioned at spaced locations along the inner tubular housing 192. For purposes which will hereinafter become apparent, the bulkheads 250, 252, 254 and 256 are secured to the inner tubular housing 192 by any suitable means, for example, screws, bolts or welding (not shown) around the circumference of the inner housing 192. Preferably, both the inner housing 192 and the bulkheads 250, 252, 254 and 256 are formed of a steel alloy, but they could be formed of any other suitable, lightweight, high-strength material.

A generally flat, elongated support member 258 extends rearwardly from the second bulkhead 252 through suitable openings in the third and fourth bulkheads 254 and 256. Secured to the rearmost end (rightmost when viewing FIG. 13) of the elongated support member 258 is a generally perpendicularly extending bracket member 260. A second hydraulically actuated means, in the present embodiment, a second hydraulic cylinder 262 is beneath the support member 258. The forward (leftward) end of the second hydraulic cylinder 262 is secured to bulkhead 252. Suitable openings are provided in bulkheads 254 and 256 so that the second hydraulic cylinder 262 extends rearwardly through said bulkhead openings and is secured on its rearward end to the bracket member 260. As with the first hydraulic cylinder 238, the second hydraulic cylinder 262 is of a type well known in the art and is commercially available.

Specific details of the structure and operation of the second hydraulic cylinder 262 need not be presented for a complete understanding of the present invention. Suffice it to say that the second hydraulic cylinder 262 includes a movable piston (not shown) which is secured to a piston rod 264 extending, through suitable sealing means, out of the second hydraulic cylinder 262. The application of hydraulic fluid under pressure causes the piston and piston rod 264 to translate in either a forward or rearward axial direction, depending upon the side of the piston to which the fluid pressure is applied. A suitable opening (not shown) is provided in the bracket member 260 to permit unobstructed movement of the piston rod 264 relative to the second hydraulic cylinder 262. The rearward or distal end of the piston rod 264 passes through a suitable opening in the rearmost bulkhead 194 and is secured to the outside of bulkhead 194 by suitable means, such as lock nuts 266 (see FIG. 16). Since the piston rod 264 is secured to bulkhead 194 which is secured to the outer tubular housing 190 and the second hydraulic cylinder 262 is secured to bulkhead 252 and support member 258 which are secured to the inner tubular housing 192, the application of hydraulic fluid under pressure to the second hydraulic cylinder 262 causes the inner tubular housing 192 to move axially with respect to the outer tubular housing 190. As shown in FIG. 7, axial movement of the inner tubular housing 190 results in corresponding axial movement of the cutter 54. Pressurized hydraulic fluid is supplied to the second hydraulic cylinder 262 by suitable conduits 184 (not shown in FIGS. 13 or 14).

Rotational movement of the cutter 54 is accomplished by a fourth hydraulically actuated means, in the present embodiment, a rotary actuator 270. The rotary actuator 270 is secured within the inner tubular housing 192 between bulkheads 25 and 252. As best seen in FIGS. 13 and 14, the rotary actuator 270 includes an enlarged diameter rotating cylinder 272 which extends through a suitably sized opening (not shown) in bulkhead 250. The rotary actuator 270 is of a type which is generally known and commercially available. However, unlike the previously described hydraulic cylinders, the rotary actuator 270 includes means (not shown) for causing the rotating cylinder 272 to rotate with respect to the outer casement of the rotary actuator 270, rather than to translate. The rotating cylinder 272 includes an axially extending key way, shown in phantom as 274 on FIG. 14. A generally annular connecting member 276, which includes a key (not shown) is adapted to be installed on the rotating cylinder 272, as shown in FIGS. 13 and 14. In this manner, the connecting member 276 rotates with the rotating cylinder 272. The cutter 54 is secured to the connecting member 276 (see FIGS. 7 and 8) in a manner which will hereinafter be described in greater detail. With the application of hydraulic fluid to the rotary actuator 270, the rotating cylinder 272 rotates, causing the connecting member 276 and the cutter 54 to correspondingly rotate. The direction of rotation of the cutter 54 is determined by the application of the pressurized hydraulic fluid. The hydraulic fluid is supplied to the rotary actuator 270 through a pair of fluid conduits 184 (not shown in FIGS. 13 and 14).

A third hydraulically actuated means, in the present embodiment, a third hydraulically actuated cylinder 280 is located within the inner tubular member 192 and is generally in axial alignment with the rotary actuator 270. The forward end (leftward when FIGS. 13 and 14) of the third hydraulic cylinder is secured to bulkhead 252. The rearward end of the third hydraulic cylinder 280 is similarly secured to a bracket member 282 which extends downwardly from the elongated support member 258. The third hydraulic cylinder 280 extends through a suitable opening (not shown) in bulkhead 254. The third hydraulic cylinder 280 is similar to the first and second hydraulic cylinders in that it includes a piston (not shown) which is adapted for axial movement in response to the application of pressurized hydraulic fluid to the third hydraulic cylinder 280. A piston rod 284 is attached to the piston for concurrent movement therewith. As best shown in FIGS. 13 and 14, the piston rod 284 extends forward (leftward) through an axially extending bore 286 in the rotating cylinder 272 of the rotary actuator 270. In this manner, the piston rod 284 of the third hydraulic cylinder may move independently of the rotational movement of the rotating cylinder 272 of the rotary actuator 270. The third hydraulic cylinder 280 is adapted for radial inward and outward movement of the cutter 54 in a manner which hereinafter be described in greater detail.

Figure 16:
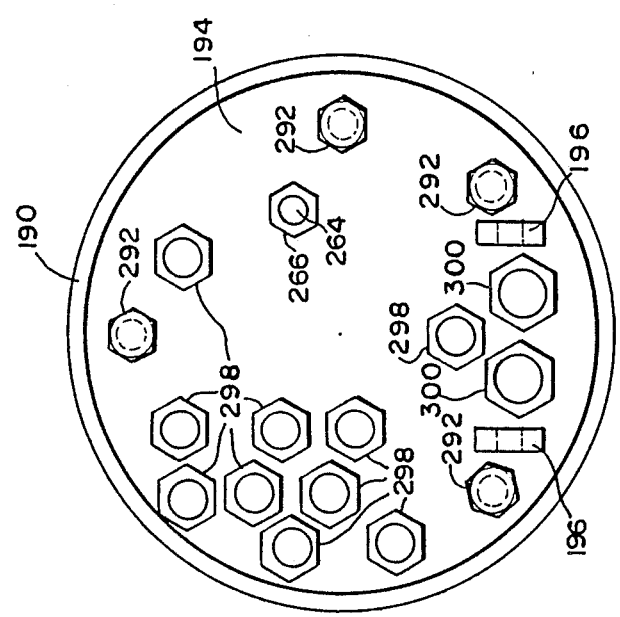
FIG. 16 is an enlarged right end view of the portion of the structural unit shown in FIG. 15.
Figure 15:
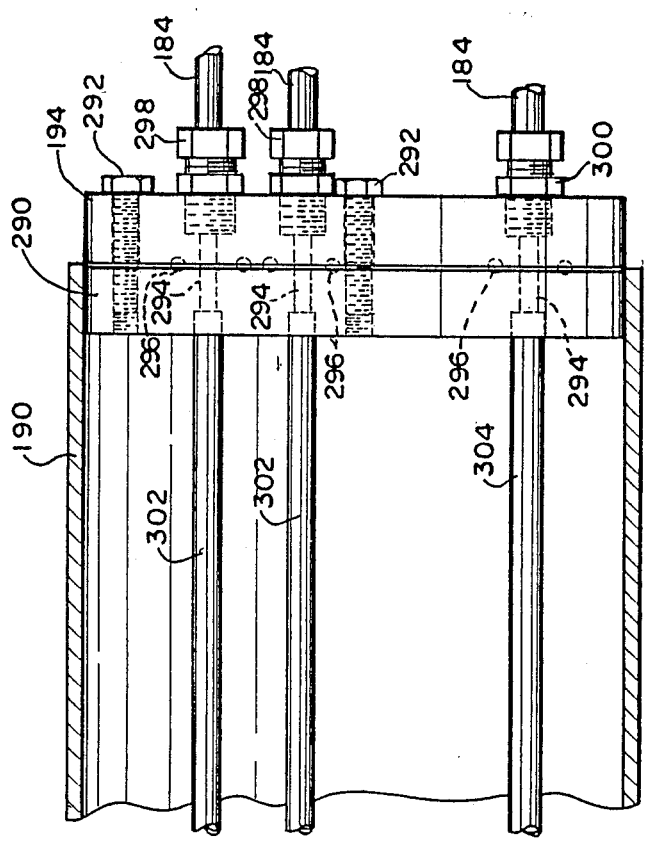
FIG. 15 is an enlarged side elevational view of a portion of the structural unit shown in FIG. 9.
Figure 17:
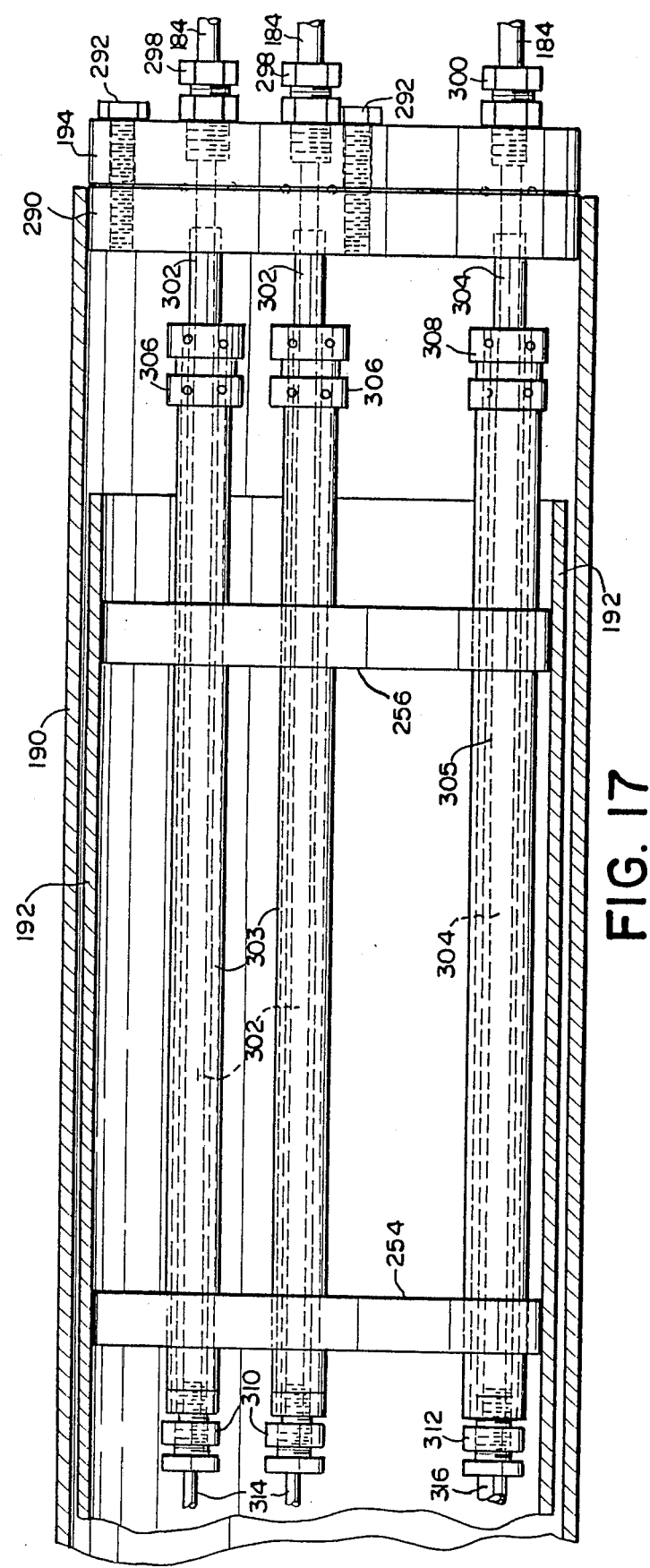
FIG. 17 is an enlarged side elevational view, partially in section, of a portion of FIG. 9.

FIGS. 15 and 16 show additional details concerning the rearward (rightmost when viewing FIGS. 13 and 14) portion of the second structural unit 34. In addition to the rearmost circular bulkhead 194, there is provided an adjacent bulkhead 290 which is secured within the rearmost portion of the outer tubular housing 190 by any suitable means, such as welding, bolts or the like. The outer bulkhead 194 is secured to the adjacent inner bulkhead 290, utilizing suitable bolts 292 at spaced locations, as shown. Holes are drilled through both bulkheads 194 and 290 for the passage of hydraulic fluid therethrough. In the present embodiment, twelve such fluid passage holes are drilled, but only three such holes 294 are shown in FIG. 15. The portion of each of the bulkheads 194 and 290 surrounding each of the holes 294 includes suitable annular grooves (not shown) which are adapted to receive sealing O rings 296 to provide a fluid type seal around each of the holes in the area where the bulkheads 194 and 290 are joined together.

The rearward end of each of the holes 294 is counterbored and a hydraulic fitting is secured within each of the counterbores. Ten of the hydraulic fittings 298 are of a first size and the other two hydraulic fittings 300 are of a second size which is larger than the first size hydraulic fittings 298, and, therefore, are adapted to receive larger size hydraulic hoses. The hydraulic hoses 184 from the third structural unit 36 are attached to the various hydraulic fittings 298 and 300 with the hoses 184 from the larger transfer ports 162 being connected to the larger hydraulic fittings 300. As will be appreciated by those skilled in the art, some slack must be provided with respect to the connection of hoses 184 to afford elevational movement of the second structural unit 34 with respect to the third structural unit 36 upon activation of the supporting skid assembly 200, as previously described. The hydraulic fittings may be of any suitably known, commercially available type, such as union fittings.

The inner sides of holes 294 are also counterbored to receive hydraulic fluid conductors, in the present embodiment, generally rigid tubular members. In the case of the holes 294 associated with the smaller hydraulic fittings, the tubular members 302 are of a first diameter, whereas with respect to the holes associated with the larger hydraulic fittings 300, the tubular members 304 are of a second, larger diameter. The tubular members 302 and 304 are secured to the counterbores, utilizing welding, cement, tube fittings, or any other suitable fluid-tight attachment means. The tubular members 302 and 304 are adapted for transferring hydraulic fluid for operation of the cutter apparatus 30 in a manner which will hereinafter become apparent.

As previously indicated, the cutter 54 is moved axially by moving the inner tubular housing 192 axially with respect to the outer tubular housing 190. Accordingly, it is necessary to provide a means for extending and contracting the hydraulic fluid conduits with the forward and rearward axial movement of the inner tubular housing 192. In the presently preferred embodiment, this function is accomplished utilizing a system of telescoping fluid conduits, best seen in FIG. 17. Surrounding each of the smaller sized tubular members 302 is a corresponding outer tubular member 303. Correspondingly, surrounding each of the larger sized tubular members 304 is an outer tubular member 305. The outer tubular members 303 and 305 are secured within suitable openings (not shown) extending through bulkheads 254 and 256 which, as previously indicated, are secured to the inner tubular housing 192. Suitable annular keeper rings (not shown) are employed for attaching the outer tubular members 303 and 305 to the bulkhead openings. As previously indicated, the inner tubular members 302 and 304 are secured on one end to the openings in bulkhead 290 which, in turn, is secured to the outer tubular housing 190. Thus, movement of the inner tubular housing 192 with respect to the outer tubular housing 190 results in corresponding telescoping movement of the outer tubular members 303 and 305 with respect to the inner tubular members 302 and 304. The inner diameters of each of the outer tubular members 303 and 305 are substantially the same as the outer diameters of the corresponding inner tubular members 302 and 304, respectively, in order to provide fluid-tight sealing. In addition, the rearward ends of each of the outer tubular members 303 and 305 include an O-ring sliding connector 306 and 308 to assist in maintaining a tight seal on the sliding surface between the outer tubular members 303 and 305 and the inner tubular members 302 and 304.

The forward end (leftward end when viewing FIG. 17) of each of the outer tubular members 303 and 305 is secured to a hydraulic fitting 310 and 312. Suitable flexible hydraulic conduits or hoses 314 and 316 are also connected to the fittings 310 and 312 for conveying hydraulic fluid to the various hydraulic cylinders for operation thereof in the manner previously described. Two of the smaller diameter hoses 314, as well as the two large diameter hoses 316, extend forward (rightward) and out of the second structural unit 34 to provide pressurized hydraulic fluid and return fluid to the articulating motion hydraulic cylinder and to the hydraulic motor for operation in a manner which will hereinafter be described. Two of the smaller diameter flexible hoses are attached to the third hydraulic cylinder 280 to effect radial inward and outward movement of the cutter 54. Another two of the small diameter flexible hoses 314 are attached to the second hydraulic cylinder 262 to provide fluid for effecting forward and rearward axial movement of the cutter 54. Another two of the small diameter flexible hoses 314 are attached to the rotary actuator 270 for providing fluid to effect rotational movement of the cutter 54.

It will be appreciated by those skilled in the art that the telescoping of the outer tubular members 303 and 305 with respect to the inner tubular members 302 and 304 upon axial movement of the inner tubular housing 192 results in an increase or a decrease in the overall size of each of the fluid systems involved. Thus, in order to maintain an appropriate fluid pressure within each fluid system, it is necessary to add hydraulic fluid to the system when the inner tubular housing 192 moves axially forward, and to remove hydraulic fluid from the system when the inner tubular housing 192 moves rearward.

Figure 18:
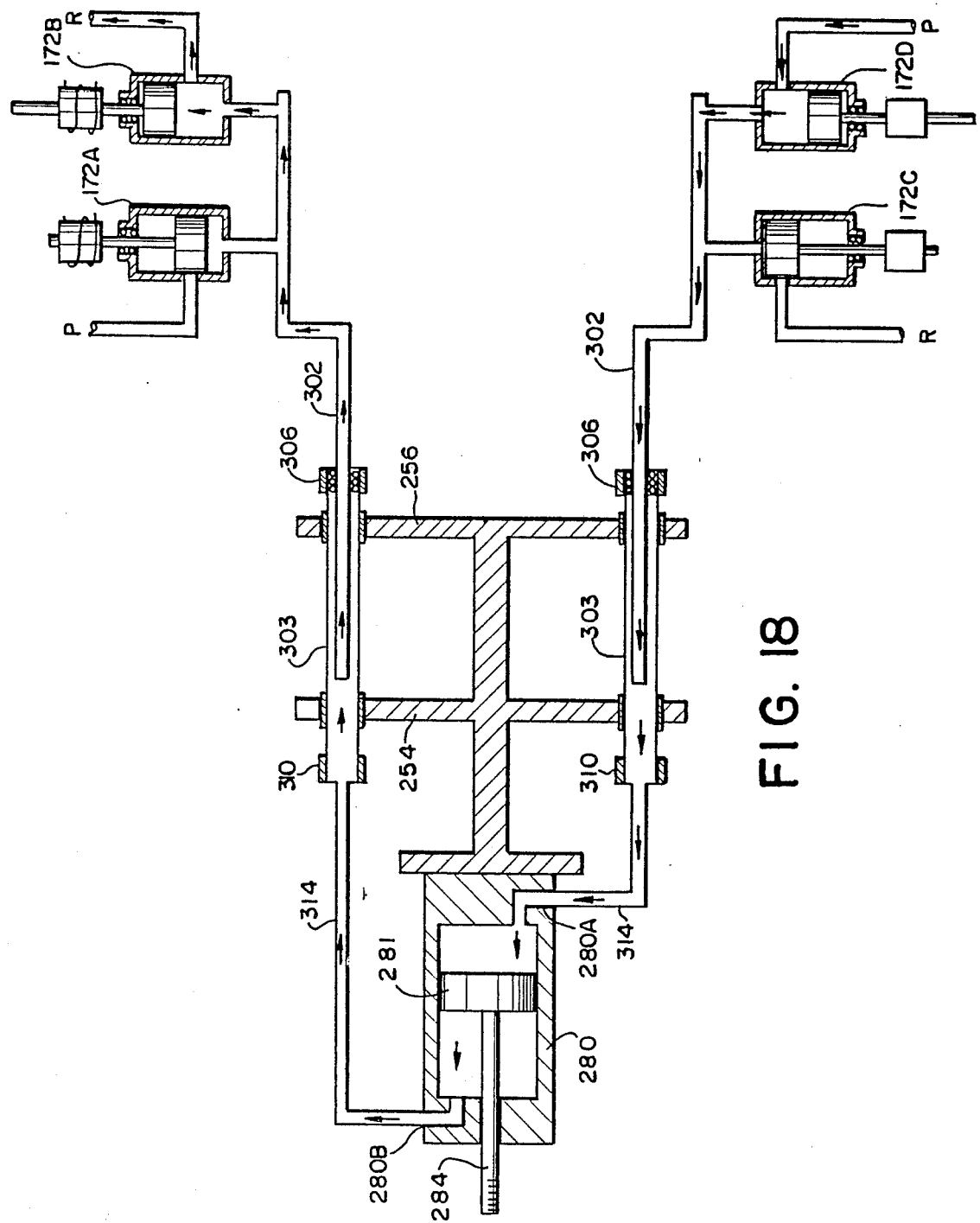
FIG. 18 is a schematic representation of a portion of the hydraulic piston of the apparatus shown in FIG. 1.

FIG. 18 is a schematic representation of a single fluid system illustrating the manner in which make-up fluid is provided and excess fluid is removed from the system. In demonstrating the techniques employed, a single hydraulic cylinder 280 has been selected, it being understood that the same techniques are employed with the other hydraulic cylinders. The connecting hydraulic hoses 314, outer and inner tubular members 303 and 302, respectively, and solenoid valves 172A-D are also shown with respect to a single system, it being understood that the same techniques are employed with the hydraulic systems employed with the other hydraulic cylinders.

The hydraulic cylinder 280 includes a piston 281, a piston rod 284, and a pair of hydraulic fluid ports, a head side port 280A and a rod side port 280B. For actuation of the piston 281 toward the left, pressure solenoid valve 172D is actuated, causing pressurized hydraulic fluid to flow into the head side fluid port 280A. At the same time, return hydraulic fluid solenoid valve 172B is actuated, permitting return fluid to flow through the rod side fluid port 280B. During movement of the piston toward the right, the other two solenoid valves 172A and 172C remain blocked. For movement of the piston in the opposite direction, solenoid valves 172A and 172C are open and solenoid valves 172B and 172D are closed, so that the hydraulic fluid flows in the opposite direction.

When the inner tubular housing 192 moves axially forward with respect to the outer tubular housing 190, means (hereinafter described) are provided for determining the extent of the forward movement and for calculating the additional volume added to the hydraulic system as a result of the telescoping of tubular members 303 and 302. The two pressurized fluid solenoid valves 172A and 172D are opened for a predetermined period of time to permit make-up fluid to flow into the hydraulic system on both sides of the hydraulic cylinder 280. Correspondingly, when the inner tubular housing 192 is moved rearwardly with respect to the outer tubular housing 190, both of the return fluid solenoid valves 172B and 172C are opened for a predetermined time period sufficient to permit excess hydraulic fluid from the hydraulic system to be bled off. As will be apparent to those skilled in the art, the same techniques are employed in connection with the hydraulic system used in connection with the other hydraulic cylinders.

Cutter Support Subassembly

Figure 19:
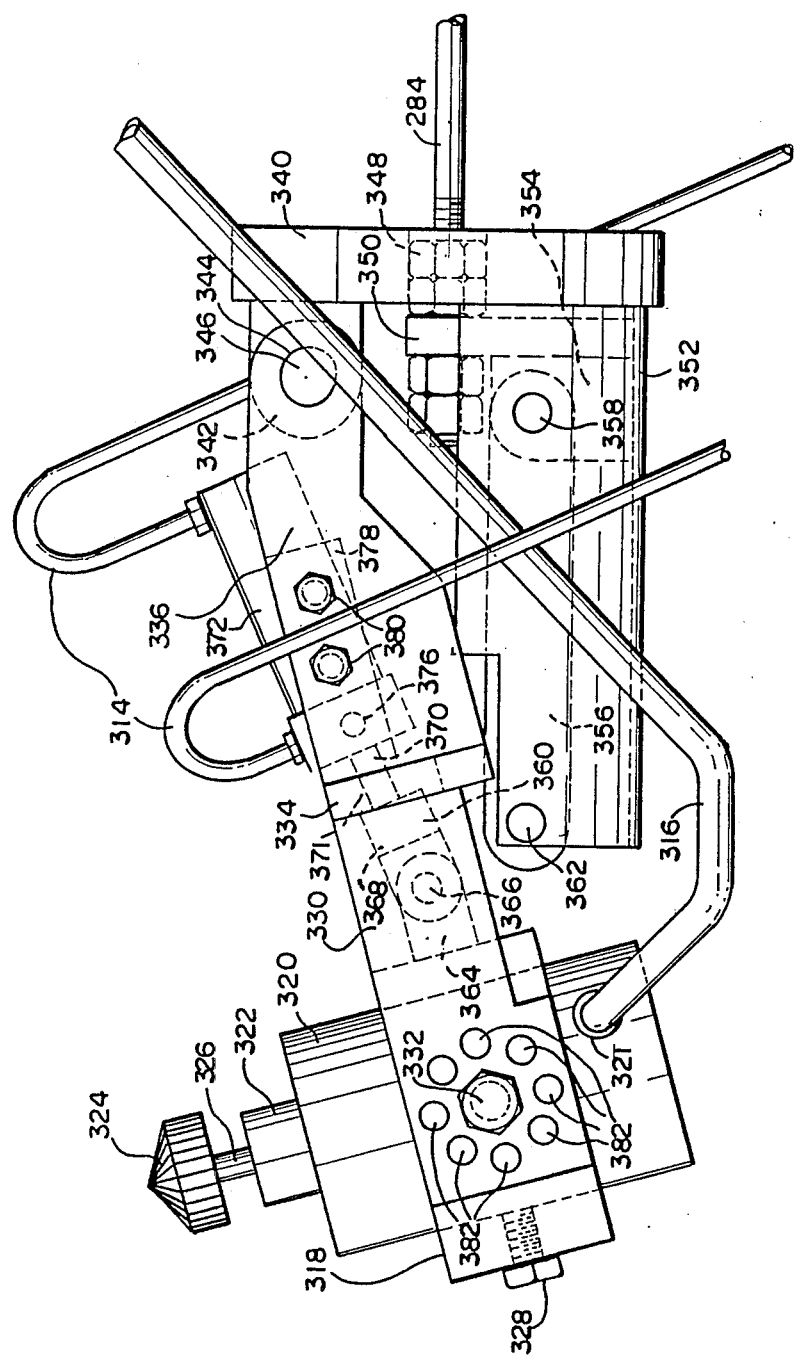
FIG. 19 is an enlarged side elevational view of a portion of the apparatus shown in FIG. 7.
Figure 20:
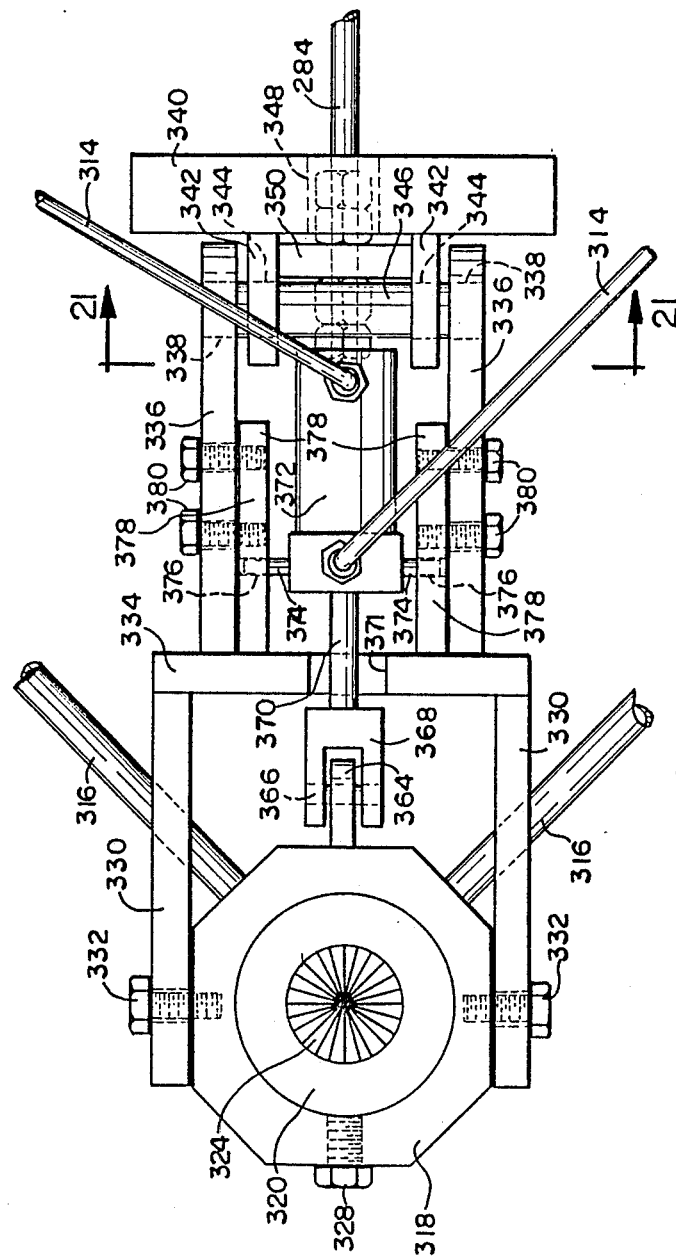
FIG. 20 is a top plan view of the portion of the apparatus shown in FIG. 19.

Referring now to FIGS. 19 and 20, there are illustrated more details of a preferred embodiment of the cutter support subassembly 52. With the present embodiment, the cutter 54 includes a hydraulically driven motor 320 of a type which is well known and generally commercially available. Details of the structure and operation of the motor 320 are generally known and will not be presented herein. Suffice it to say that the motor 320 includes an inlet port 321 for receiving pressurized hydraulic fluid from one of the large diameter hydraulic hoses 316 and an outlet or return port (not shown) for discharging hydraulic fluid to the other large diameter hydraulic hose 316. The hydraulic motor 320 receives the pressurized hydraulic fluid and converts the energy thereof into rotary motion of the motor output shaft (not shown). The distal end of the motor output shaft includes a collet 322 which is adapted for connection to the shaft 326 of a bit or cutting tool 324 which may include cutting teeth arranged in a predetermined pattern for engaging and cutting the liner 46. The cutting tool 324 shown in FIGS. 19 and 20 is the type preferably employed in cutting a liner opening in a main sewer pipe, as best illustrated in FIG. 7. A larger sized generally annular cutting tool 325 (FIG. 8) referred to as a "biscuit" type cutting tool is preferably utilized when the cutter 54 is employed for trimming off the protruding end of a lateral liner 51, as shown in FIG. 8, The cutter motor 320 is positioned at the forward end of the cutter support subassembly 52. A cutter motor housing 318 having a generally circular opening (not shown) extending generally vertically therethrough surrounds and supports the cutter motor 320. In the present embodiment, a suitable locking bolt 328 extends through the cutter motor housing 318 to engage and retain the cutter motor 320 at a desired height with respect to the cutter motor housing 318. Additional locking bolts may be provided, if desired. By loosening the locking bolt 328, the height of the cutter motor 320 may be conveniently adjusted.

The cutter motor housing 318 is supported on both lateral sides by a pair of generally parallel support arms 330. A pair of axially aligned bolt members 322 extend through the support arms and into the cutter motor housing 318 for pivotally supporting the cutter motor housing 318. The rearward ends of the parallel support arms 330 are secured to a generally perpendicularly extending cross member 334. The cross member 334 is attached to the support arms 330 by brazing, bolts or by any other suitable form of attachment. The rearward side (rightward when viewing FIGS. 19 and 20) of the cross member 334 is similarly secured to a pair of generally parallel, rearwardly extending support arm extensions 336. Aligned generally circular openings 338 extend laterally through the rearward portion of the support arm extensions 336.

A generally circular support plate 340 is adapted to be secured to the connecting member 276 (see FIGS. 7 and 8) for rotation therewith. The support plate 340 may be secured to the connecting member 276 utilizing a plurality of bolts (not shown) so that the two components may be easily separated for servicing. Extending outwardly from the forward surface of the support plate 340 is a pair of generally parallel lug members 342 having aligned, generally circular openings 344 extending laterally therethrough. A suitably sized pin member 346 extends through the lug member openings 344 and the support arm extension openings 338, pivotally connecting the support arm extensions 336 to the support plate 340. Means (not shown) are provided for locking the pin member 346 in position to prevent inadvertent or accidental removal from the openings 344 and 338. In this manner, the support arm extensions 336, cross ember 334, support arms 330, cutter motor housing 318, and the cutter motor 320 are pivotable as a single generally rigid unit with respect to the support plate 340 about the pin member 346 to effect inward and outward radial movement of the cutter 54.

Figure 21:
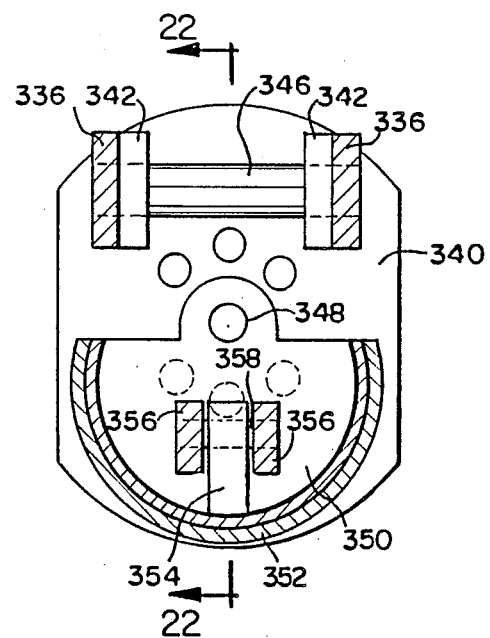
FIG. 21 is a sectional view of a portion of the apparatus of FIG. 20 taken along line 21—21.
Figure 22:
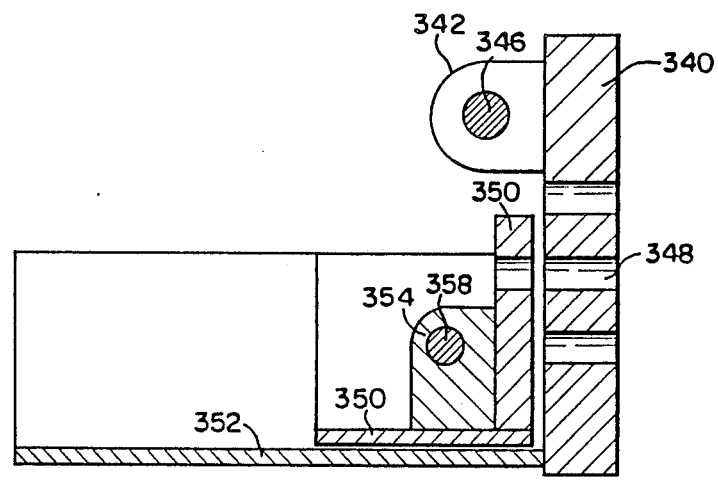
FIG. 22 is a sectional view of a portion of the apparatus of FIG. 21 taken along line 22—22.

As previously discussed, inward and outward radial movement of the cutter 54 is controlled by the third hydraulic cylinder 280 (see FIG. 14). The piston rod 284 associated with hydraulic cylinder 280 extends through a suitable opening 348 in the support plate 340 and is secured to the generally circular portion of an irregularly shaped generally curved member 350 (best seen in FIG. 21). The other, generally cylindrical sliding curved member 350 is movably supported by a generally fixed curved support member 352 extending outwardly from the lower portion of the support plate 340. A lug member 354 extends outwardly from the circular portion of member 350. The lug member 354 is adapted to be pivotally secured to a clevis-type connection on one end of an elongated linking member 356, utilizing a suitable pin member 358. The other end of the linking member 356 includes a similar clevis-type connector which is similarly, pivotally secured by a pin member 362 to another lug member 360, which, in turn, is secured to the cross member 334. In this manner, movement of the piston rod 284, for example, in the forward direction, results in corresponding forward movement of the member 350, causing the rearward end of the linking member 356 to also move forward. Forward movement of the rearward end of the linking member 356 causes the forward end of the linking member 356 to move generally upwardly (when viewing FIG. 19), thereby causing the cutter motor 320 and its supporting structure to pivot upwardly (or radially outwardly when in a sewer pipe), as previously described. Correspondingly, rearward movement of the piston rod 284 results in the cutter motor 320 pivoting downwardly (radially inwardly).

As previously indicated, the cutter motor housing 318 is pivotally secured to the forward end of the support arms 330, utilizing bolts 332. The rearward end of the cutter motor housing 318 includes a rearwardly extending lug member 364 which is connected by a suitable pin member 366 to a clevis connector 368. The clevis connector 368 is secured to the piston rod 370 of a fifth hydraulically actuated means, in the present embodiment, a fifth hydraulic cylinder 372. The fifth hydraulic cylinder 372 is substantially the same type as the various hydraulic cylinders previously described. The fifth hydraulic cylinder 372 is pivotally supported by a pair of laterally outwardly extending aligned pin members 374, which extend into suitable openings 376 on the lateral surfaces of a pair of generally parallel support plates 378. The support plates 378 are secured to the support arm extensions 336 utilizing suitable bolts 380. A pair of hydraulic hoses 314 are connected to the fifth hydraulic cylinder 372 for operation. The application of pressurized hydraulic fluid to the head side of the piston of the fifth hydraulic cylinder 372 causes the piston and piston rod 370 to extend outwardly from the fifth hydraulic cylinder 372, thereby pivoting the cutter motor housing 318 and the cutter motor 320 in the clockwise direction when viewing FIG. 19.

Similarly, the application of pressurized hydraulic fluid to the rod side of the fifth hydraulic cylinder 372 causes the piston rod to be withdrawn, thereby pivoting the cutter motor housing 318 in the counterclockwise direction when viewing FIG. 19. Pivoting or articulation of the cutter motor housing is desirable when utilizing the cutter in a generally vertical orientation for removal of portions of the liner 46 of a main sewer pipe 48, in the manner shown in FIG. 7.

However, when employing the cutter 30 for the removal of protruding portions of a liner 51 extending outwardly from an interconnecting lateral 50, as shown in FIG. 8, articulation of the cutter motor housing 318 is not necessary or desirable. Accordingly, the cutter motor housing 318 and the support arms 330 are provided with a plurality of generally circular openings 382 in the form of a bolt circle. The openings 382 are for the purpose of locking the cutter motor housing 318 in a predetermined or fixed generally axial orientation with respect to the support arm 330 utilizing suitable bolts 383 (see FIG. 8). In this manner, the fifth hydraulic cylinder 372 can be removed and the cutter motor housing 318 can be locked in the orientation as shown in FIG. 8.

Control Assembly

Figure 23:
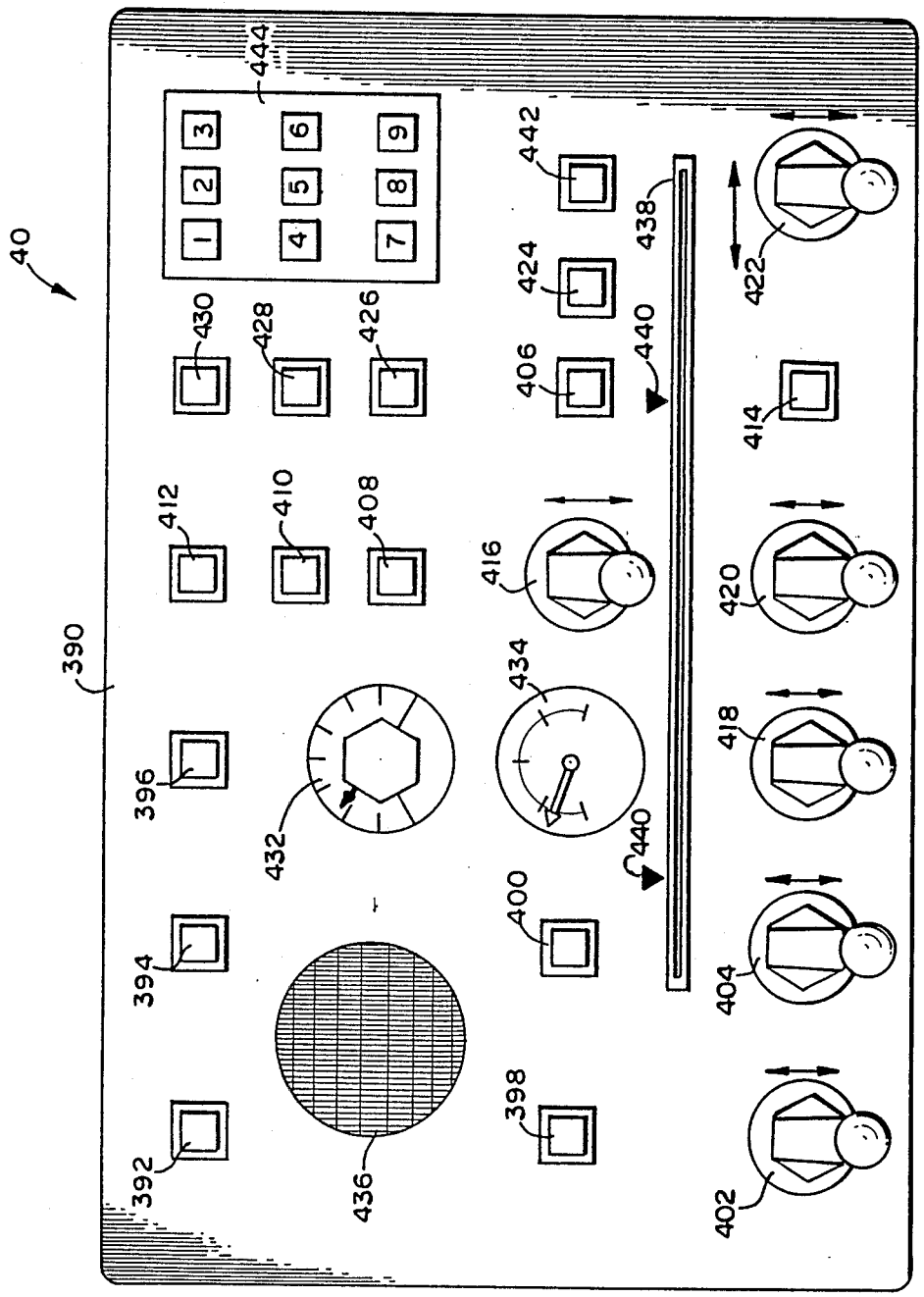
FIG. 23 is a top plan view of the control panel shown in FIG. 1.

Referring now to FIG. 23, there is shown a preferred embodiment of a control panel 390 employed in conjunction with the control assembly 40. As previously indicated, the control assembly 40 generates a plurality of preferably electrical control signals which are transmitted along cables 42 and 44 to permit an operator located in front of the control panel 390 to remotely control the entire operation of the cutter apparatus 30 within the sewer pipe 48. The control assembly 40 includes means (not shown) for generating the electrical signals in response to the actions of the operator with respect to the hereinafter described control components on the control panel 390. The signal generating means (not shown) comprises a computer system, including a processor or microprocessor, memory and input/output sections, suitable computer software, and appropriate wiring and other interconnecting means.

In the presently preferred embodiment, the control panel 390 includes a plurality of push button type switches, each of which is employed for control of a particular control function hereinafter discussed. The push button switches are each of a type well known in the art and are adapted to alternately close or open the switch contacts (not shown) each time the switch button on the control panel 390 is depressed. Each push button switch also includes an indicator means, preferably a light (not shown) disposed within the push button to provide an indication to the operator with respect to the state of the push button switch, i.e., when the switch contacts are closed, the light is illuminated.

Electrical power is provided to the control assembly 40 from a suitable electrical power source (not shown) which may be conventional line current, or, if operating in a remote location, may be supplied by a suitable generator (not shown). A first push button switch 392 is employed as an on/off switch for controlling the application of the electrical power from the power source to the control assembly 40. Similarly, push button switch 394 is employed as an on/off switch to control the application of electrical power to the electrical pump motor 94 contained within the fourth structural unit 38. A third push button switch 396 is employed as an on/off switch for controlling the application of electrical power to the first structural unit 32 to power the audio and video subassemblies.

As previously indicated, the steel cables 66 and 68 which are employed for pulling the interconnected operational units 32, 34, 36 and 38 through the sewer pipe 48 may be connected, respectively, to motor driven mechanical winch means (not shown), one of which is located within or proximate to each of the manholes 62 and 64. Push button switches 398 and 400 are employed as on/off switches to control the application of electrical power to the forward and rear cable winches, when employed. In the presently preferred embodiment, push button switch 398 controls the application of power to the forward (leftward when viewing FIG. 1) winch and push button switch 400 controls the application of power to the rear (rightward when viewing FIG. 1) winch. Once the power has been provided to the forward and rear winches, a corresponding pair of control means, in the present embodiment, lever switches 402 and 404 are employed for controlling the winding or unwinding of the cables 66 and 68 by the winches. In the presently preferred embodiment, pulling forward on lever switch 402 results in the forward winch winding the cable 66 onto the winch reel, whereas pulling forward on lever switch 404 results in unwinding the rear cable 68 from the rear winch reel. Thus, to move the operational units 32, 34, 36 and 38 in the forward direction (upstream), both lever switches 402 and 404 must be pulled forward (toward the bottom of the page when viewing FIG. 23). By controlling movement of the lever switches 402 and 404, the operator is able to precisely position the linked operational units 32, 34, 36 and 38 at virtually any desired location within the sewer pipe 48 between the two manholes 62 and 64.

Push button switch 406 is utilized as an on/off switch to control the supply of pressurized hydraulic fluid to the cutter motor 320 (as previously described) for rotation of the cutter motor shaft 322. As will hereinafter be described in greater detail, with the presently preferred embodiment, the cutter motor 320 operates at three different speeds, described as slow, medium and fast. Separate push button switches 408, 410 and 412 are employed, respectively, to permit the operator to select the desired cutter motor speed, depending upon the type of cutting to be accomplished. Lockout means (not shown) are provided so that only a single motor operating speed can be selected at any given time. As long as the cutter motor on/off switch 406 is depressed in the on condition, the cutter motor 320 operates continuously at the speed indicated by whichever motor speed button 408, 410 and 412 is actuated. An additional push-and-hold type button 414 is provided to permit the operator to "pulse" the motor 320 and to thereby operate the cutter motor 320 in a more precisely controlled manner. When the cutter motor on/off push button switch 406 is in the off condition, the push-and-hold switch 414 may be depressed and held by the operator for any desired length of time. As long as the push-and-hold switch 414 is depressed, the cutter motor 320 operates at the speed selected by the operator.

Control of the various movements of the cutter 54 and cutter supporting subassembly 52, as well as the operation of the holder subassembly 56 is obtained by lever switches 416, 418, 420 and joy stick 422. Lever switch 416 is employed for actuating the holder subassembly. Pulling forward on lever switch 416 results in radial outward movement of the supporting skid subassemblies 200 in the manner as previously described. Similarly, pushing back (towards the top of the page when viewing FIG. 23) on the lever switch 416 results in retraction of the supporting skid subassemblies 200.

Articulation or pivoting of the cutter motor housing 318 is controlled by lever switch 418. Pulling lever switch 418 forward causes the cutter motor housing 318 to pivot in the clockwise direction when viewing FIG. 19, whereas pushing back on lever switch 418 results in the cutter motor housing 318 pivoting in the counterclockwise direction when viewing FIG. 19.

Lever switch 420 is employed for controlling the radial inward and outward movement of the cutter motor 320 and its supporting structure, as previously described. Pulling the lever switch 420 forward causes the cutter motor housing 318 and its supporting structure to move radially outwardly, while pushing back on the lever switch 420 causes the cutter motor housing 318 and its supporting structure to move radially inwardly.

Joy stick 422 is employed to control both forward and rearward axial movement of the inner tubular housing 192 and the cutter supporting subassembly 52, as well as rotation of the cutter supporting subassembly 52, as previously described. Forward axial movement is obtained by pulling the joy stick 422 forward and rearward axial movement is obtained by pushing back on joy stick 422. Similarly, clockwise rotation of the cutter support subassembly 52 is obtained by moving the handle of joy stick 422 toward the right, whereas counterclockwise rotation of the cutter support subassembly 52 is obtained by moving the joy stick 422 to the left.

A separate push button switch 424 is employed as an on/off switch to control the application of power to the various above-discussed lever switches 416, 418, 420 and joy stick 422. When the manual operation on/off switch 424 is depressed to the on position, the lever switches 416, 418, 420 and joy stick 422 may be actuated by the operator to perform the various above-described cutter functions. When the manual operation on/off switch 424 is in the off position, the various lever switches 416, 418, 420 and joy stick 422 are disabled to lock the cutter 54 in place. As with the cutter motor 320, the speed of the various movements of the cutter 54 and cutter supporting subassembly 52 may be varied between slow, medium and fast. Suitable push button switches 426, 428 and 430, respectively, are provided for this purpose. By selecting which of the three movement speed switches 426, 428 and 430 is depressed, the operator can selectively control the amount of pressurized hydraulic fluid which flows to and from the various hydraulic cylinders employed for movement of the cutter 54 and cutter supporting subassembly 52.

In the presently preferred embodiment, the speed of the cutter motor 320, as well as the speed of movement of the cutter 54 and cutter supporting subassembly 52, is controlled by controlling the amount of hydraulic fluid supplied to the cutter motor 320 or to the various hydraulic cylinders. The amount of pressurized hydraulic fluid is controlled by varying the on/off duty cycle of the various solenoid valves 154. For this purpose, the control assembly 40 includes an internal timing means or clock (not shown) which in the presently preferred embodiment generates a series of digital pulses at a rate of about 30 pulses per second. The pulses are employed for controlling the actuation of the solenoid valves 154, either by varying the number of pulses per second, or by varying the width or time duration of each pulse. For example, increasing the width of each pulse while maintaining the same number of pulses per second increases the "on" portion of the duty cycle for the solenoid valves 154, thereby permitting a greater quantity of hydraulic fluid to flow through the valves 154 during a given period of time (per second). Similarly, decreasing the duration or width of each pulse decreases the "on" portion of the duty cycle, thereby decreasing the amount of pressurized hydraulic fluid flowing through the solenoid valves 154 for a given period of time. In the presently preferred embodiment, the number of pulses generated per second remains constant with changes in the state of the speed control buttons 408, 410, 412, 426, 428 and 430 causing variations in the width of the pulses. Variations in the size of the conduits, tubing or hoses employed for transporting the pressurized hydraulic fluid can also be used to vary the speed of the cutter motor 320 and/or movement of the cutter 54 and cutter supporting subassembly 52.

The speed of the electric motor 94 which drives the hydraulic pump 92 may also be controlled by the operator. In the present embodiment, a voltage control means or rheostat 432 is provided for varying the electric motor voltage. An ammeter 434 is also provided to give the operator an indication of the electrical current being drawn by the electric motor 94. As will be appreciated by those skilled in the art, turning the rheostat 432 in a clockwise direction increases the voltage applied to the electric motor 94, causing the motor 94 to operate at a higher speed to turn the hydraulic pump 92 at an increased speed rate. Increasing the speed of the pump 92 increases the pressure of the pressurized hydraulic fluid, thereby providing additional speed and/or power to the various operational cylinders and to the cutter motor 320. Turning the rheostat 432 in the counterclockwise direction has the opposite effect.

As previously described, it has been found that greater flexibility and control is provided if the operator is able to hear the actual cutting which is occurring within the sewer pipe 48. With proper training and experience, an operator can differentiate between the sound made by a cutter tool 324 engaging a portion of a liner 46 with an open lateral 50 behind it and the sound made by a cutter tool 324 engaging, for example, the pipe edge of an interengaging, connecting lateral 50. Therefore, a suitable speaker 436 is provided on the face of the control panel 390, the speaker 436 being connected to the audio subassembly (not shown) which may be located in the first structural unit 32, as described above, or may be located on the cutter supporting subassembly 52 (not shown) and which is adapted for providing the operator with the needed audio information.

The control panel 390 also includes indicator means to provide an indication to the operator of the axial position of the cutting tool 324. In the presently preferred embodiment, the indicator means comprises an elongated display means, preferably a state-of-the-art display, such as a light-emitting diode (LED) display 438. The LED display is electrically connected to a suitable movement detection device (not shown) which is associated with the cutter positioning subassembly 58 and is adapted to provide a lighted indication of the position of the cutting tool 334 with respect to axial movement of the cutter supporting subassembly 52. For example, when the inner tubular housing 192 is fully retracted within the surrounding outer housing 190, the LED indicator shows the cutting tool 324 as being all the way to right (when viewing FIG. 23). Similarly, when the inner tubular housing 192 is fully extended with respect to the outer housing 190, the LED indicator 438 shows the cutting tool 324 as being all the way to the left. This feature of the control panel 390 is particularly helpful in that it permits the operator to keep careful track of the position of the cutting tool 324 with respect to the dimensions of the lateral opening being cut. Suitable marker means, in the present embodiment magnetic arrows 440, may be employed for marking particular locations along the LED indicator. For example, when utilizing the cutter apparatus 30 for cutting the portion of a liner surrounding a particular lateral 50, it is desirable to know the forward and rear axial locations of the walls of the lateral 50. These locations can be ascertained by careful axial movement of the cutter 54 and, when located, can be marked utilizing the marker means 440. The operator then knows that it is safe to operate the cutter 54 within the limits of the two marker means without fear of the cutting tool 324 engaging the walls of the lateral 50.

As previously indicated, the control assembly 40 includes a computer or microprocessor system (not shown). The microprocessor system is suitably programmed to cooperate with the axial and rotational movement joy stick 422 to add small amounts of hydraulic fluid to all of the telescoping hydraulic tubes 302 and 304 (see FIG. 17) when the inner tubular housing 192 moves axially forward with respect to the outer tubular housing 190. Similarly, the microprocessor is programmed to bleed off small amounts of hydraulic fluid from all of the telescoping hydraulic tubes 302 and 304 when the inner tubular housing 192 moves axially rearwardly. In this manner, the proper amount of hydraulic fluid is maintained in the various conduits and tubes while permitting unfettered axial movement of the cutter 54.

The computer system may also be programmed to permit automated cutting of a liner 46. The control panel 390 includes input means in the form of a numeric input pad 444 for permitting the operator to provide instructions to the computer system. Similarly, a push button switch 442 is provided to engage and disengage the computer system for automated cutting. The computer may be preprogrammed with control information for cutting away the liner extending over an intersecting lateral of a particular size and intersection angle, for example, a 90 degree intersection of a four inch lateral with an eight inch sewer pipe. A particular programmed cutting pattern may be activated by the operator first positioning the cutting tool 324 in the center of the intersection of the lateral and the sewer pipe. The operator then punches in a particular code for loading the portion of the program pertaining to the particular cutting pattern for the lateral utilizing the numeric input pad 444. The automated on/off switch 422 is then depressed by the operator to transfer control to the computer system. The computer system controls the axial and rotational movement of the cutter 54 and cutter supporting subassembly 52 to cut out the liner in the predetermined pattern. Various cutting patterns can be stored in the memory of the computer system to provide for automated cutting of the various types of laterals and angles employed in connection with a particular size or type of sewer pipe. One preferred cutting pattern is to have the cutter tool 324 move in an ever increasing spiral from the lateral center to the lateral pipe walls.

From the foregoing description, it can be seen that the present invention comprises a remotely controlled articulatable cutter apparatus for use within a conduit, preferably a sewer pipe. The present invention provides an alternative to the prior art cutter which is more economical and efficient to operate and which provides greatly enhanced reliability and flexibility of operation. It will be recognized by those skilled in the art that changes may be made to the above-described embodiment of the invention without departing from the broad inventive concept thereof. It is understood, therefore, that this invention is not limited to the particular embodiment disclosed, but it is intended to cover all modifications which are within the scope and spirit of the invention as defined by the appended claims.

I claim:

1. A remotely controlled, articulatable hydraulically operated cutter apparatus for use within a conduit having an axis, the cutter apparatus comprising:

control means located outside of the conduit for generating a plurality of control signals for controlling the operation of the cutter apparatus;

three structural units located within the conduit and sequentially coupled together end to end for concurrent movement within the conduit;

a first of said structural units including a source of pressurized hydraulic fluid;

a second of said structural units including valve means in fluid communication with the fluid source and connected with the control means for receiving pressurized hydraulic fluid from the fluid source and the control signals from the control means and for distributing the received hydraulic fluid in accordance with the received control signals;

the third of said structural units comprising a cutter supporting subassembly, a holder subassembly and a cutter positioning subassembly;

a hydraulically powered cutter motor pivotally supported by the cutter supporting subassembly and extending along an axis generally perpendicular to the axis of the conduit, the cutter motor including a cutting tool, said cutter motor being in fluid communication with the valve means and receiving hydraulic fluid from the valve means for driving the cutting tool;

first hydraulically actuated means comprising a single hydraulic cylinder within the holder subassembly and in fluid communication with the valve means for receiving hydraulic fluid from the valve means for axially centering the third structural unit within the conduit and for holding the third structural unit at a fixed axial position within the conduit as long as the received hydraulic fluid exceeds a predetermined minimum;

second hydraulically actuated means within the cutter positioning subassembly and in fluid communication with the valve means for receiving hydraulic fluid from the valve means for varying the axial position of the cutter motor with respect to the third structural unit in accordance with the received hydraulic fluid;

third hydraulically actuated means within the cutter positioning subassembly and in fluid communication with the valve means for receiving hydraulic fluid from the valve means for varying the radial position of the cutter motor with respect to the third structural unit in accordance with the received hydraulic fluid;

fourth hydraulically actuated means within the cutter positioning subassembly and in fluid communication with the valve means for receiving hydraulic fluid from the valve means for rotating the cutter motor up to 180 degrees about the axis of the conduit in either a clockwise or counterclockwise direction with respect to an initial position in accordance with the received hydraulic fluid; and fifth hydraulically actuated means within the cutter supporting subassembly and in fluid communication with the valve means for receiving hydraulic fluid from the valve means for pivoting the cutter motor about the axis extending generally perpendicular to the axis of the conduit, the first, second, third, fourth and fifth hydraulically actuated means cooperating to position the cutter motor in accordance with the control signals to facilitate the cutting by the cutting tool.

2. The apparatus as recited in claim 1 wherein the valve means comprises:

manifold means with the second structural unit including an inlet port in fluid communication with the fluid source for receiving the pressurized fluid from the fluid source, an outlet port in fluid communication with the fluid source for transmitting fluid to the fluid source and a plurality of fluid transfer ports in fluid communication with the cutter motor and the first, second, third, fourth and fifth hydraulically actuated means for transmitting pressurized hydraulic fluid to and for receiving return hydraulic fluid from the cutter motor and the first, second, third, fourth and fifth hydraulically actuated means;

a plurality of electrically operated solenoid valves coupled with the manifold means and connected to the control means for selectively directing the hydraulic fluid between the manifold means inlet and outlet ports and the manifold means transfer ports in accordance with the received control signals; and conduit means connected to the manifold means fluid transfer ports for conducting hydraulic fluid between the manifold means and the cutter motor, and the first, second, third, fourth and fifth hydraulically actuated means.

3. The apparatus as recited in claim 2 wherein the conduit means for conducting hydraulic fluid between the manifold means and each of the cutter motor, second, third, fourth and fifth hydraulically actuated means includes a plurality of first tubular members of a first diameter and a corresponding plurality of second tubular members of a second diameter greater than the first diameter, each of said second tubular members at least partially surrounding and being slideably movable with respect to a corresponding one of said first tubular members, one of said pluralities of tubular members being secured to a portion of the cutter positioning subassembly which is fixed with respect to the third structural unit and the other of said pluralities of tubular members being secured to a portion of the cutter positioning subassembly which is axially movable with the cutter motor with respect to the third structural unit so that axial movement of the cutter motor with respect to the third structural unit results in axial telescoping movement of said other plurality of tubular members with respect to said one plurality of tubular members to vary the axial length of said conduit means.

4. The apparatus as recited in claim 3 further including sealing means on said other plurality of tubular members for sealing the joints between said first and second tubular members.

5. The apparatus as recited in claim 3 wherein said first tubular members are secured to said fixed portion of the cutter positioning subassembly and said second tubular members move telescopingly with respect to said first tubular members.

6. The apparatus as recited in claim 5 and further including means communicating with the valve means of adding hydraulic fluid to said first tubular members when said axial telescoping movement of said second tubular members extends the length of said conduit means, and means communicating with the valve means for removing hydraulic fluid from said first tubular members when said axial telescoping movement of said second tubular members shortens the length of said conduit means, the addition or removal of hydraulic fluid to compensate for changes in the length of said conduit means, while maintaining a substantially constant fluid pressure.

7. The apparatus as recited in claim 1 wherein the cutter positioning subassembly comprises a generally tubular outer housing having a first predetermined diameter and a generally tubular inner housing having a second predetermined diameter, the inner housing and outer housing having a common axis, the inner housing extending at least partially into the outer housing and being adapted for relative axial movement with respect to the outer housing and wherein the outer housing includes at least three supporting skid subassemblies position at circumferentially spaced locations, the skid subassemblies all being concurrently movable by the first hydraulically actuated means between a retracted position proximate the outer housing and a radially extended position, the skid subassemblies each being adapted to engage the conduit for centering and holding the third structural unit when in the extended position.

8. The apparatus as recited in claim 7 wherein each said subassembly is comprised of:
an elongated skid member extending generally parallel to the outer housing;
at least one bell crank member having two legs, the bell crank member being pivotally secured to the outer housing proximate the intersection of the two legs, one leg of the bell crank member being pivotally secured to the skid member; and
an elongated power transmission member extending generally parallel to the tubular housing, the power transmission member being pivotally secured to the other leg of the bell crank member, the power transmission member also being secured to the first hydraulically actuated means, whereby the receipt of hydraulic fluid by the first hydraulically actuated means causes the power transmission member to move axially, rotating the bell crank member to thereby move the skid member radially.

9. The apparatus as recited in claim 8 wherein at least one skid member includes a pair of wheels, one wheel being rotatably supported proximate each axial end of the skid member.

10. The apparatus as recited in claim 1 further including a cutter motor housing which surrounds and supports the cutter motor and a pair of generally parallel supports arms, the support arms being secured on one end of the cutter supporting subassembly, the other end of the support arm pivotally supporting the cutter motor housing.

11. The apparatus as recited in claim 10 wherein the cutter motor housing includes a lug member which is pivotally connected to the fifth hydraulically actuated means.

12. The apparatus as recited in claim 11 wherein the fifth hydraulically actuated means comprises a hydraulic cylinder having a piston and piston rod, the hydraulic cylinder being pivotally secured to the parallel support arms and the piston rod being pivotally secured to the lug member, whereby the application of hydraulic fluid to the hydraulic cylinder causes the piston to translate, thereby pivoting the cutter motor housing and cutter motor with respect to the support arms.

13. The apparatus as recited in claim 10 wherein the parallel support arms are pivotally secured on the one end to the cutter supporting subassembly and further comprising an elongated linking member pivotally secured on one end to the supports arms at a position removed from the one end, the other end of the linking member being pivotally secured to the third hydraulically actuated means, whereby the receipt of hydraulic fluid by the third hydraulically actuated means causes the linking member to pivot, thereby varying the radial position of the parallel support arms, the cutter motor housing and the cutter motor with respect to the third structural unit.

14. The apparatus as recited in claim 1 wherein the source of pressurized hydraulic fluid is comprised of an electrically powered motor, a hydraulic pump driven by the electric motor and a hydraulic fluid reservoir in fluid communication with the pump, and wherein the control means comprises means for supplying electrical power to the motor and means for varying the voltage of the electrical power supplied to the motor to vary both the motor speed and pump speed to vary the pressure of the hydraulic fluid.

15. The apparatus as recited in claim 1 wherein the control means comprises an elongated analog indicator means communicating with the cutter positioning subassembly for indicating to the operator the axial location of the cutting tool with respect to the third structural unit.

16. The apparatus as recited in claim 15 wherein the control means further includes movable marker means cooperating with the indicator means for providing means to identify for the operator determined limits for the axial movement of the cutting tool.

17. The apparatus as recited in claim 1 wherein the cutter motor is pivoted with respect to the third structural unit so that the cutting tool is generally parallel with the axis of the conduit.

18. The apparatus as recited in claim 17 wherein the cutting tool is generally annular.

* * * * *